United States Patent [19]

Matsumoto et al.

[11] Patent Number: 4,802,034
[45] Date of Patent: Jan. 31, 1989

[54] TAPE LOADING DEVICE WITH VARIABLE TAPE TENSION MECHANISM FOR RECORDING REPRODUCING APPARATUS

[75] Inventors: Yoshiharu Matsumoto; Atuhiro Kumagai, both of Yokohama; Shuichi Ota, Sagamihara, all of Japan

[73] Assignee: Sony Corporation, Tokyo, Japan

[21] Appl. No.: 83,929

[22] Filed: Aug. 4, 1987

Related U.S. Application Data

[63] Continuation of Ser. No. 675,838, Nov. 19, 1984, abandoned.

[30] Foreign Application Priority Data

Mar. 18, 1983 [JP] Japan .................................. 58-45755

[51] Int. Cl.$^4$ ...................... G11B 5/027; G11B 5/008; G11B 15/00
[52] U.S. Cl. ...................................... 360/85; 360/96.5
[58] Field of Search ............................ 360/85, 95, 96.5

[56] References Cited

U.S. PATENT DOCUMENTS

| | | | |
|---|---|---|---|
| 3,851,816 | 12/1974 | Katoh | 360/95 |
| 3,911,491 | 10/1975 | Terao | 360/85 |
| 3,911,492 | 10/1975 | Ura | 360/85 |
| 4,012,788 | 5/1977 | Blanding | 360/85 |
| 4,060,840 | 11/1977 | Umeda | 360/85 |
| 4,491,885 | 1/1985 | Morikawa et al. | 360/85 |
| 4,611,251 | 9/1986 | Yokoo | 360/85 |
| 4,614,315 | 9/1986 | Gerrits et al. | 360/85 |

Primary Examiner—Robert S. Tupper
Assistant Examiner—Melissa J. Koval
Attorney, Agent, or Firm—Lewis H. Eslinger; Jay H. Maioli

[57] ABSTRACT

Described is a magnetic recording and reproducing apparatus wherein a magnetic tape is placed on and adapted to travel along the outer periphery of a tape guide drum which is provided with rotary magnetic heads for recording image signals or the like information signals on the magnetic tape or reproducing such signals already recorded on the magnetic tape. A loading ring for winding the magnetic tape about the guide drum and a loading lever unit for shifting tape guide means for pulling and placing the tape along a predetermined tape route are driven by common rotational driving means so that the overall size of the apparatus may be reduced. In addition, the operation of the loading ring and that of the loading lever unit are adapted to occur in two separate stages of operation in such a manner that the magnetic tape is unloaded first of all from the tape guide drum and then unloaded from the remaining tape guide means for preventing an injury to the magnetic tape during tape unloading.

6 Claims, 13 Drawing Sheets

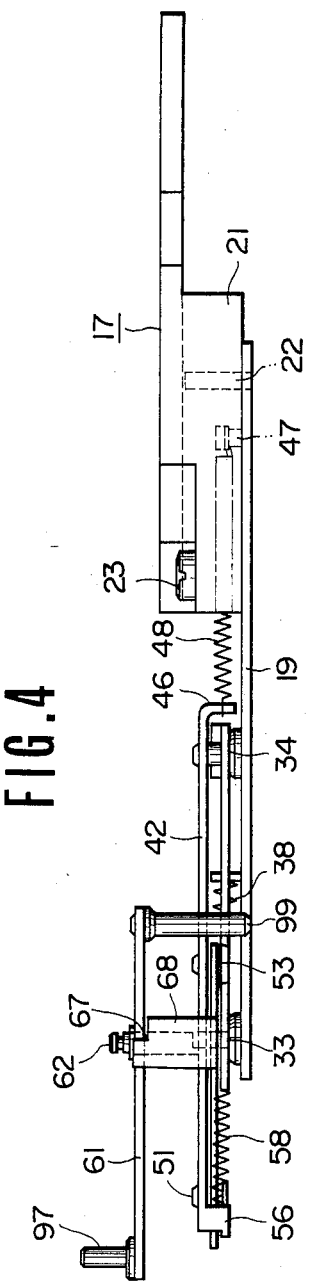
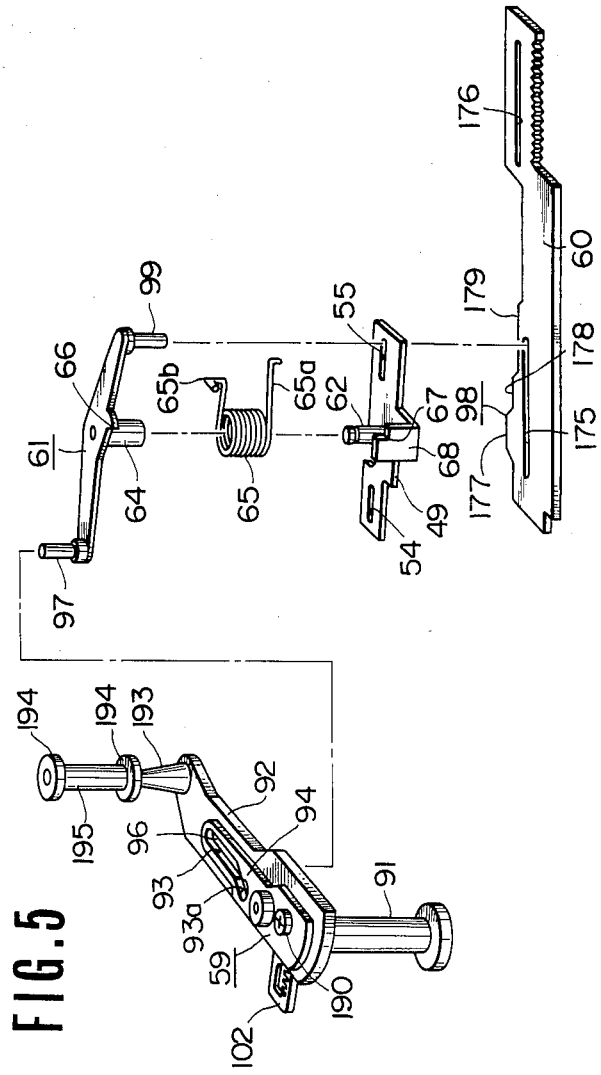
FIG.4
FIG.5

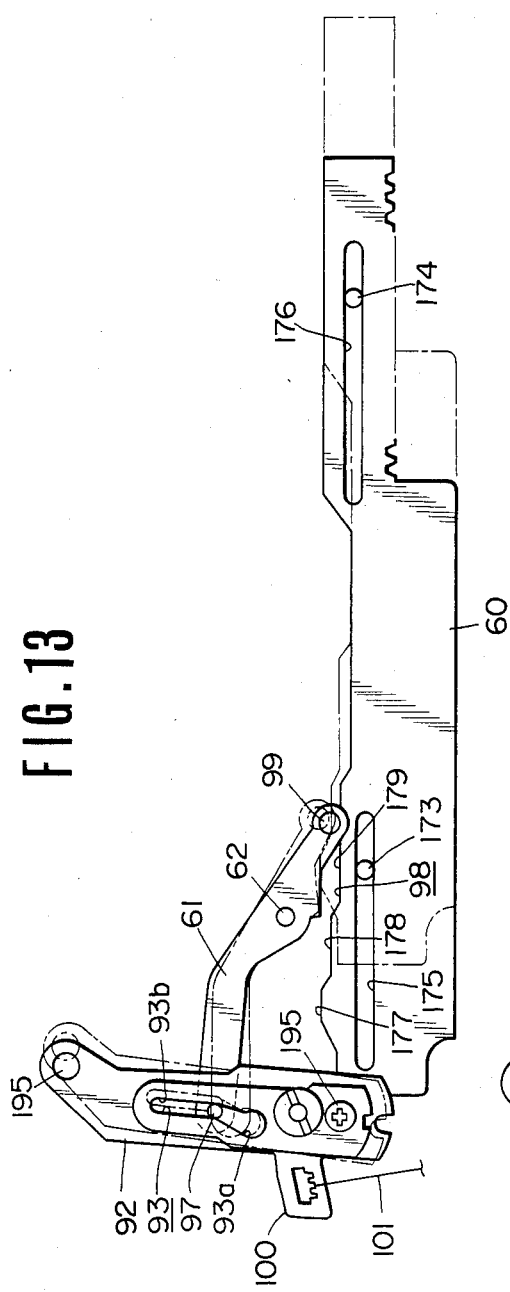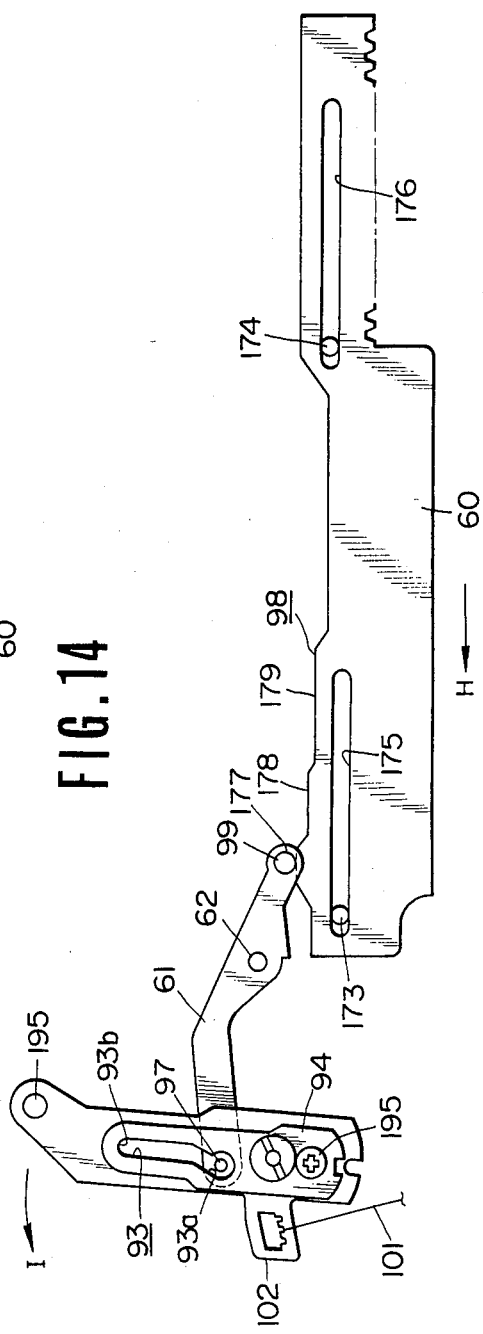

4,802,034

TAPE LOADING DEVICE WITH VARIABLE TAPE TENSION MECHANISM FOR RECORDING REPRODUCING APPARATUS

This is a continuation of application Ser. No. 675,838 filed Nov. 19, 1984 now abandoned.

TECHNICAL FIELD

This invention relates to a magnetic recording and reproducing apparatus in which a magnetic tape is placed and adapted to travel on the outer periphery of a tape guide drum provided with rotary magnetic heads for recording image signals or the like information signals on the magnetic tape or reproducing image signals already recorded on the magnetic tape.

BACKGROUND ART

In a magnetic recording and reproducing apparatus, a magnetic tape is placed and adapted to travel on the outer periphery of a tape guide drum equipped with rotary magnetic heads, for recording image signals or similar information signals or reproducing image signals already recorded on the magnetic tape. When the tape is placed on its preset route, it is folded intricately by the aid of tape guides and placed about the periphery of the tape guide drum over an angular extent of more than 180 degrees. Thus, when left for prolonged time in the loaded state, that is, as it is partially coiled about the tape guide drum and placed on the preset tape route, it can be easily adhered to the tape guide drum surface.

The conventional magnetic recording and reproducing apparatus of the type described above is usually so constructed that, when the magnetic tape is pulled back from its loaded state towards the tape mounting section (tape unloading operation), tape guide means such as tension regulator for extending and placing the magnetic tape on the preset tape route or the loading ring adapted for placing the tape around the tape guide drum may be rotated or shifted in unison.

In the above described apparatus in which the tape guide means such as tension regulator and loading ring are actuated in unison for unloading the magnetic tape from the extended, or loaded position, should the tape have become adhered to the tape guide drum surface, as mentioned hereinabove, the unloading operation is terminated while the tape is still left in the tape route and is not taken up or withdrawn into the tape cassette. Should the tape cassette be taken out of the cassette mounting section in this state, the tape may be injured or occasionally severed.

On the other hand, the loading unit or mechanism of the above described apparatus for pulling out the magnetic tape from the tape cassette and placing it on the tape route around the tape guide drum provided with rotary magnetic heads is so constructed and arranged that the loading ring adapted for guiding the tape for placing it about the tape guide drum is driven in rotation by a driving electric motor, while a tension regulator associated with the travelling tape for placing a preset tension on the tape as a function of the selected operating mode is driven by an active element such as solenoid plunger separate from the driving electric motor.

Since the prior-art apparatus makes use of plural driving devices such as a driving electric motor or a solenoid plunger for driving a loading mechanism adapted for placing the tape along the preset tape route, a mounting space is required for at least plural driving devices which makes it difficult to reduce the overall size of the apparatus. In addition, since the magnetic tape is loaded by plural driving devices, means must be provided for operatively coordinating the respective driving devices, which complicates the mechanism and further makes it difficult to reduce the overall size of the apparatus.

The loading ring employed in the above described prior-art magnetic recording and reproducing apparatus is connected to the driving shaft of the driving electric motor via a connection gearing in such a manner that the driving force developed in the electric motor is transmitted to the loading ring.

In the magnetic recording and reproducing apparatus, it is also known to have the loading ring mounted at an angle with respect to the chassis plate for further reducing the size of the apparatus. In order that the loading ring thus inclined with respect to the chassis plate may be connected to the connection gearing having its supporting shaft erected upright on the chassis plate, it is necessary that a bevel gear inclined at an angle equal to the mounting angle be provided to the outer periphery of the loading ring and also that another bevel gear be provided to the connection gearing for meshing with the firstly mentioned bevel gear. However, it is extremely difficult to get the bevel gear accurately machined in the large-sized loading ring which is placed around the tape winding guide drum and which is provided with a guide for guiding the magnetic tape. It is therefore difficult to have the loading ring properly meshing with the bevel gear constituting the connection gearing and to provide for smooth and accurate revolution of the loading ring.

Thus the present invention contemplates to provide a magnetic recording and reproducing apparatus which is so designed that, should the magnetic tape have become adhered to the tape guide drum, the tape can be released positively from the tape guide drum without injury to the tape thus providing for safe unloading of the magnetic tape.

The present invention also contemplates to provide a magnetic recording and reproducing apparatus which makes possible further reduction in size of the apparatus through reducing the number of the driving members performing the tape unloading operation.

The present invention also contemplates to provide a magnetic recording and reproducing apparatus which makes use of a folding guide unit or mechanism as means for pulling out and guiding the magnetic tape from the tape cassette mounting section towards the tape guide drum so as to enable the tape to be pulled out to a distant point by a small-sized mechanism thereby making possible further reduction in the size of the apparatus.

The present invention also contemplates to provide a magnetic recording and reproducing apparatus which provides for precise and simple connection between the loading ring inclined with respect to the mounting plane of the chassis plate and connection gearing means adapted for transmitting the torque of the driving electric motor to the loading ring, for thereby dispensing with special machining operation of the loading ring and reducing the space of the apparatus.

DISCLOSURE OF THE INVENTION

These objects of the present invention are accomplished in accordance with the present invention by a magnetic recording and reproducing apparatus comprising a tape guide drum provided with rotary magnetic heads, a loading ring driven in rotation by rotational driving means and adapted for placing a magnetic tape on the periphery of said tape guide drum, tape guide means for pulling out and guiding the tape from a tape mounting section towards and along a predetermined tape passageway or route, and a loading lever unit adapted for guiding said tape guide means, wherein the apparatus operates in such a manner that the winding of the magnetic tape on said guide drum is released by rotationally driving said loading ring by said rotational driving means and said loading lever unit is then operated for shifting said tape guide means to its original position for pulling the tape from the position extending along said tape route to a position accommodated within said tape cassette mounting section.

According to a further feature of the present invention, there are provided a loading lever driven by a planetary gearing, means for shifting a folding guide unit from a first position to a second position by the driving operation of said loading lever, said folding guide unit pulling and guiding in turn a magnetic tape from a tape mounting section towards a tape guide drum equipped with rotary magnetic heads, and means for shifting a tension regulator from a first position to a second position by the driving operation of said loading lever.

According to a still further feature of the present invention, there are provided a loading ring adapted to be rotated for winding a magnetic tape about the outer periphery of a tape guide drum equipped with rotary magnetic heads, and a ring gear adapted for rotating said loading ring, said loading ring being mounted at an angle relative to the mounting plane of the ring gear, and said loading ring being connected by a pair of mutually meshing bevel gears, one of which has a shaft perpendicular to the mounting plane and the other of which has a shaft perpendicular to the loading ring plane, a line interconnecting said shafts running parallel to the plane of maximum inclination of said loading ring.

According to another feature of the present invention, the electric motor driving the loading ring is controlled as a function of a position along a circular orbit of the planetary gear for positively controlling the operation of the loading electric motor.

BRIEF DESCRIPTION OF THE DRAWINGS

FIG. 4 is a side elevation showing the assembled state of the loading lever unit.

FIG. 5 is an exploded perspective view showing a tension regulator and related parts.

FIG. 13 is a plan view showing the operating state of the tension regulator during loading.

FIG. 14 is a plan view showing the status of the tension regulator in the recording reproducing state.

BEST MODE FOR EXECUTION OF THE INVENTION

Figure 1:
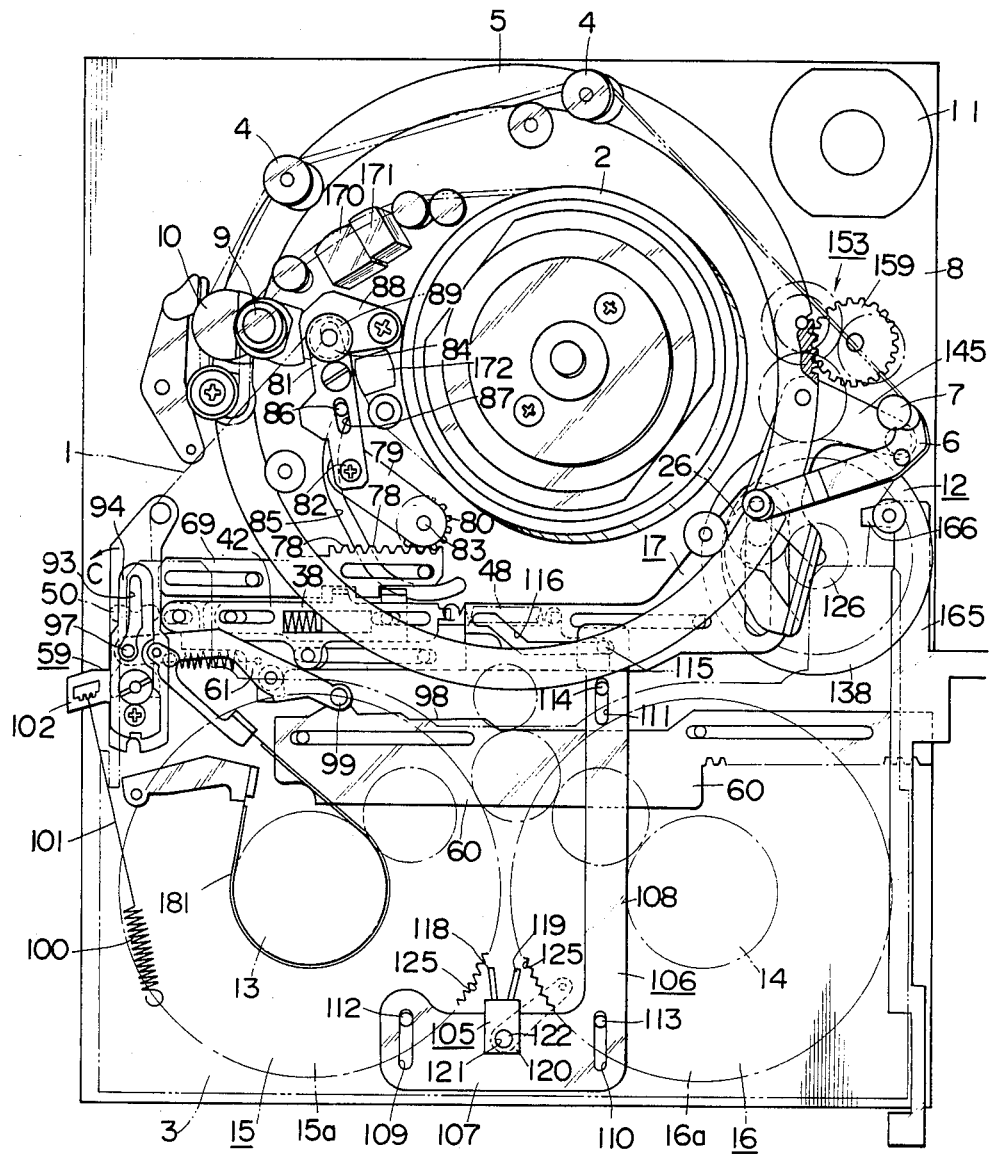
FIG. 1 is a plan view of a magnetic recording and reproducing apparatus according to the present invention in the state of tape loading.

An embodiment of the present invention is hereafter explained by referring to the drawings.

The magnetic recording and recording apparatus of the present invention has a tape guide drum 2 around which a magnetic tape 1 drawn out from a tape cassette 3 mounted within a tape mounting section as shown in FIG. 1 is wound in the form of a letter U and over an angular extent of more than 180 degrees. The tape guide drum 2 is comprised of an upper drum driven in rotation by a drum driving electric motor, and a stationary lower drum. A rotary magnetic head is mounted to said upper drum so that its foremost part is projected slightly from the upper drum for magnetic recording on or reproduction from the magnetic tape 1. To the outer periphery of the tape guide drum 2 is rotatably mounted a loading ring 5 by means of which the magnetic tape 1 drawn out from the tape cassette 3 is guided so as to be wound about the outer periphery of the tape guide drum 2. The loading ring 5 is provided with a plurality of upright guide rolls 4, a guide roll 7 mounted to the foremost part of a rotatably journaled arm 6, and a pinch roll 10 cooperating with a capstan 9 mounted upright on a chassis plate 8 for clamping the tape 1 and causing the tape 1 to travel at a constant speed. The loading ring 5 is driven in rotation by a planetary gearing 12 driven by a loading electric motor 11, in such a manner that the magnetic tape 1 placed about the guide rolls 4, 7 is wound about the tape guide drum 2.

On the side opposite to the tape guide drum 2, there is provided a cassette mounting section to which the tape cassette 3 is mounted and which is provided with a cassette holder by which the mounted tape cassette 3 is held in position and the mounted tape cassette 3 is raised back towards a cassette insertion opening of the main body of the apparatus when the tape cassette is to be ejected. The cassette mounting section is provided with a pair of reel blocks 13, 14 and the tape cassette 3 is mounted in such a manner that a tape supply reel 15 about which the magnetic tape 1 is wound and a tape winding reel 16 are fitted to the associated reel blocks 13, 14, respectively.

Figure 2:
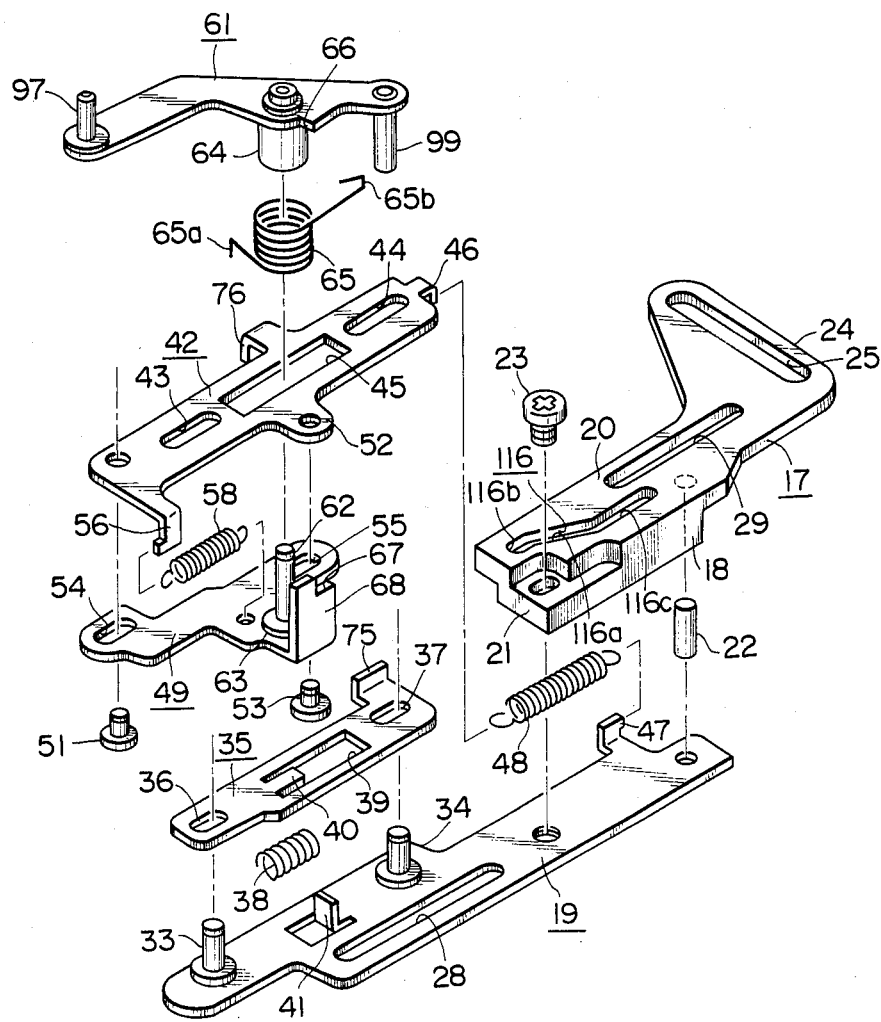
FIG. 2 is an exploded perspective view showing a loading lever unit of the magnetic recording and reproducing apparatus of the present invention.

Intermediate the cassette mounting section and the tape guide drum 2, there is mounted a loading lever unit including a loading lever 17 that may be reciprocated by the planetary gearing 12 along a front opening or tape pull-out side of the tape cassette 3. The loading lever 17 of the loading lever unit is formed by a substantially L-shaped first lever section 18 and a straight second lever section 19, as shown in FIG. 2. The first and second lever sections 18, 19 are connected together by a connecting pin 22 and a connecting screw 23 with one side of the second lever section 19 overlapping with the underside of a step 21 formed on one side on the underside of a horizontal section of the first lever 20. The loading lever 17 thus constructed is so mounted that a gear shaft 27 of a planetary gear 26 of the planetary gearing 12 is introduced through an elongated opening 25 having its long axis in alignment with the longitudinal direction of a vertical section 24 of the first lever section 18, and supporting pins 31, 32 mounted upright on the chassis plate 8 are introduced through elongated openings 28, 29 having their long axes in alignment with the longitudinal direction of the horizontal section 20 of the first lever section 18 and with the longitudinal direction of the second lever section 19, respectively. By the driving of the gearing 12, the loading lever 17 thus mounted may be horizontally reciprocated with the supporting pins 31, 32 being guided along the elongated openings 28, 29. A pair of guide shafts 33, 34 are mounted upright on the second lever section 19 constituting the loading lever 17. A folding guide operating lever 35 adapted for causing the travel of a folding guide unit to be later described is mounted by these guide shafts 33, 34. The folding guide operating lever 35 is superposed on the second lever section 19 in such a manner that the guide shafts 33, 34 are introduced into elongated openings 36, 37 having their long axes aligned with the longitudinal direction of the lever 35 so as to be slidable within the extent of the openings 36, 37. The lever 35 has a central through-opening 39 for receiving a coil spring 38. A projection 40 is formed on one side of the through-opening 39 for engaging with one end of the coil spring 38. A second projection 41 is formed by partially cutting and erecting a mid-portion of the second lever section 19 for confronting to the projection 40. The coil spring 38 is retained at one end by the projection 40 and at the other by the second projection 41. Thus, the folding guide operating lever 35 is biased by the coil spring 38 towards the foremost part of the loading lever 17.

A sub-loading lever 42 is mounted by means of the pair of upright guide shafts 33, 34 on the second lever section 19 of the loading lever 17 for overlapping with the folding guide operating lever 35. As is the folding guide operating lever 35, the sub-loading lever 42 is slidably mounted within the extent of elongated openings 43, 44 by having the guide shafts 33, 34 introduced into said openings 43, 44 having their long axes in the longitudinal direction of the sub-loading lever 42. The sub-loading lever has an elongated center opening 45 for partially accommodating the coil spring 38 introduced in the through-opening 39 in the folding guide operating lever 35. An engaging portion 46 is formed by bending the end of the sub-loading lever opposite to the first lever section 18 of the loading lever 17. The sub-loading lever is biased towards the first lever section 18 of the loading lever 17 by a tension spring placed between the engaging portion 46 and a second engaging portion 47 formed by bending up an end part of the second lever section 19 of the loading lever 17.

A tension regulator operating lever 49 is slidably mounted to the forward lower surface of the sub-loading lever 42. This lever 49 is mounted in such a manner that a guide pin 51 is passed through an elongated opening 54 in the lever 49 and through an opening at the forward part of the sub-loading lever 42 to be riveted thereat and that another guide pin 53 is passed through an elongated opening 55 in the lever 49 and through an opening in a central side lug 52 of the sub-loading lever 42 to be riveted thereat, said openings 54, 55 having their long axes in alignment with the longitudinal direction of the command lever 49. The lever 49 is biased towards the forward part of the sub-loading lever 42 by a tension spring 58 mounted under tension between a foremost downward lug 56 of the sub-loading lever and a central engaging opening 57 in the operating lever 49. As shown in FIG. 1, a stopper 50 is mounted at a position facing to the foremost part of the operating lever 49 for regulation the movement of the operating lever 49 during loading. The operating lever 49 is mounted across the foremost and lateral sides of the sub-loading lever 42 so that it has its foremost side bent in an L-shape. The operating lever 49 has a central arm shaft mounting side lug 63 having an upright arm shaft 62 rotatably carrying a tension regulator rotary arm 61. In dependence upon reciprocating movement of the tension regulator operating lever 49, the tension regulator rotary arm 61 causes the tension regulator 59 to be rotated from a first unloading position in which the magnetic tape 1 is retracted into tape cassette 3 to a second loading position in which the tape is extracted to the predetermined tape passage. In addition, the position of the tension regulator 59 operated in rotation by a mode selector lever 60 slidingly operated in dependence upon the selected operating mode of the magnetic recording and reproducing apparatus is variably set by the arm 61. The arm shaft 62 is mounted upright on the side lug 63 by having its lower end riveted in a mounting hole in the lug 63. The tension regulator rotary arm 61 attached to the arm shaft 62 has the shape of a letter U and has a central through-opening in which a cylindrical boss 64 is received and riveted. The boss 64 is placed over the arm shaft 62 and thus rotatably mounted to the shaft 62. A coil spring 65 is placed around the boss 64. The spring 65 has its one end 65a engaged by one side of the operating lever 49 and has a hooked engaging part 65b at the other end so that the spring is engaged by said hooked part with one side of the tension regulator rotary arm 61 and wound about boss 4. The coil spring thus causes the rotary arm 61 to rotate clockwise in FIG. 3. The foremost part of the side lug 63 has an upright engaging lug 68 having an end step 67 engaging with an engaging central lug 66 of the rotary arm 61 for regulating the rotational position of the rotary arm 61 biased into rotation by coil spring 65.

Figure 3:
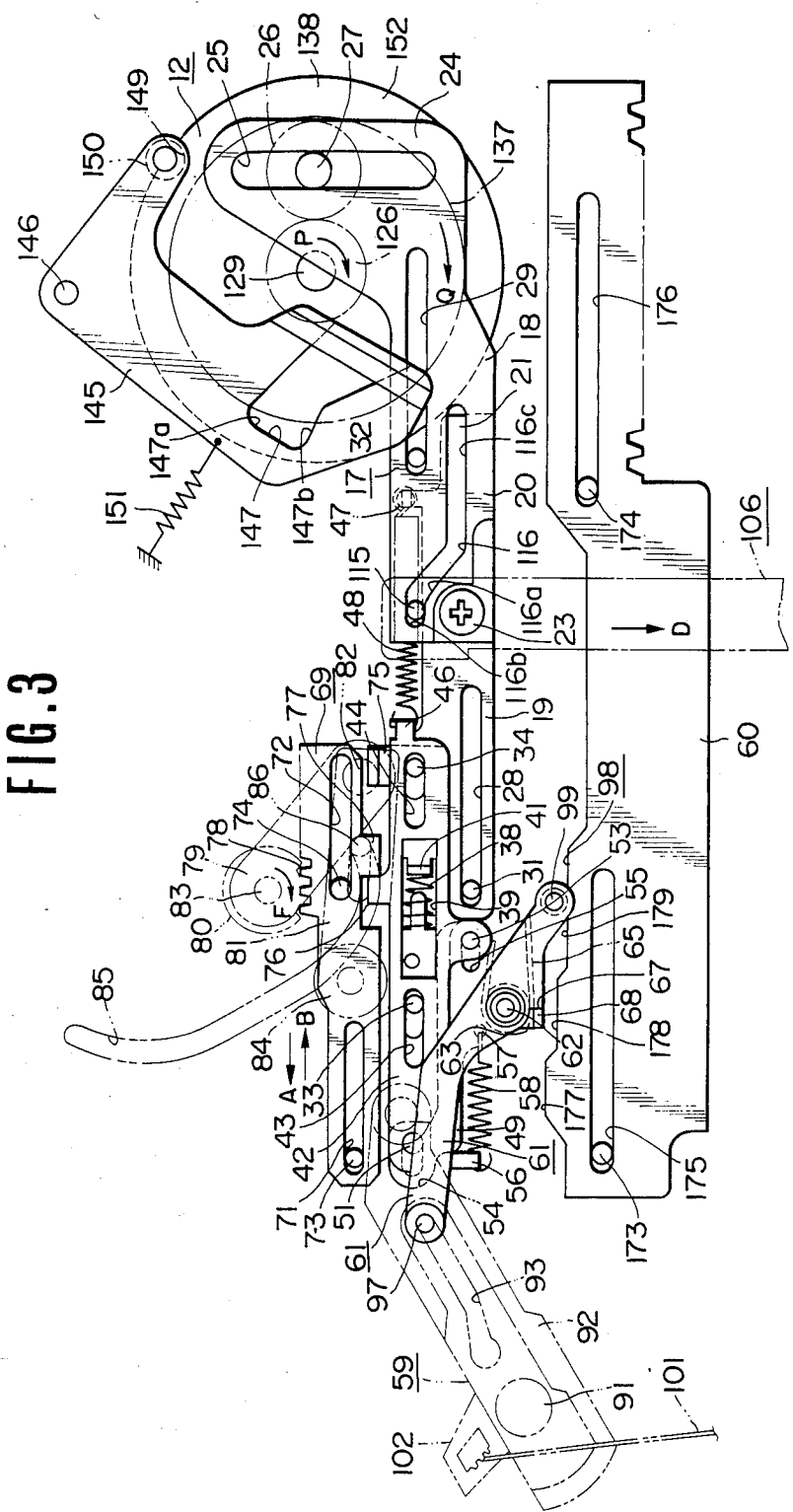
FIG. 3 is a plan view showing essential parts of the apparatus including said loading lever unit.

A rack plate 69 slid by the folding guide operating lever 35 for shifting the folding guide unit is mounted along the sides of the operating lever 35 and the sub-loading lever 42 facing to the guide drum 2, as shown in FIG. 3. The rack plate 69 is supported in such a manner that supporting pins 73, 74 mounted upright on the chassis plate 8 are introduced into elongated openings 71, 72 having their long axes in the longitudinal direction of the rack plate 69 and shifted within the range of the openings 71, 72. On the side of the rack plate 69 facing to the folding guide operating lever 35 and the sub-loading lever 42, the rack plate is formed with a projection 77 which may be selectively engaged during shifting by a foremost lateral upright thrust projection 75 of the operating lever 35 and a central depending thrust projection 76 of the sub-loading lever 42 and which may thereby be subjected to a thrust pressure. Thus, during loading of the magnetic tape 1, the projection 77 of the rack plate 69 is pushed by thrust projection 75 of the folding guide operating lever 35 so that the plate 69 is shifted in the direction indicated by the arrow mark A in FIG. 3. During unloading of the magnetic tape 1, the projection 77 is pushed by the thrust projection 76 of the sub-loading lever 42 so that the plate 69 is shifted in the direction indicated by the arrow mark B in FIG. 3. On the side of the rack plate 69 opposite to the projection 77, the plate 69 is formed with a rack gear 78 meshing with a rotary gear 80 formed at the bottom end of a first folding guide lever 69 constituting a folding guide unit.

It should be noted that the folding guide unit constituting the present invention is provided along one side of the guide drum 2 and has a first folding guide lever 79 and a second folding guide lever 81. The second folding guide lever 81 has its bottom end rotatably connected by pivot pin 82 to the forward part of the first folding lever 79 so that the guide lever 81 may be folded against the first folding lever 79 about said pivot pin 82. The first folding guide lever 79 is carried by an upright supporting pin 83 on the chassis plate 8 as one with the rotary gear 80 so that the guide lever 79 may be driven in rotation in unison with rotation of the rotary gear 80. A guide pole 84 about which the magnetic tape 1 is wound is erected upright at the foremost part of the second folding guide lever 81, and a guide pin 86 is mounted at a central part of the second folding guide lever for engaging in a folding guide lever guide slot 85 in the chassis plate 8 for guiding the second folding guide lever 81. The guide pin 86 is movable within the range of an elongated opening 87. Thus, when the first folding guide lever 79 is driven in rotation, the second folding guide lever 81 is shifted with the guide pin 86 being guided in the folding guide lever guide slot 85 in such a manner that, during loading of the magnetic tape 1, the second folding guide lever is shifted so as to be extended away from the cassette mounting section and along one side of the guide drum 2 for guiding the magnetic tape 1 around the periphery of the guide drum 2. A stopper member 88 for regulating the position of extension of the second folding guide lever 81 is provided laterally of the guide drum 2 and adjacent to the end of the travel path of the second folding guide lever 81. The one edge of the stopper member 88 is formed with an engaging groove 89 into which the upright guide pole 84 on the foremost part of the second folding guide lever 81 is engaged, so that, when the second folding guide lever 81 is extended along one side of the guide drum for loading the tape in the predetermined tape passage of route, the one end of the guide pole 84 is engaged within the engaging groove 89 for regulating the extending position of the second folding guide lever 81.

The tension regulator 59, variably operated by the tension regulator rotary arm 61, is mounted, as shown in FIG. 1, at the tape extracting side of the cassette mounting section which is the forward side of the loading lever unit. The tension regulator 59 is constructed as shown in FIG. 5. The tension regulator 59 has a tension regulator arm 92 having its bottom end rotatably carried by a supporting post 91 mounted upright on the chassis plate 8. This tension regulator arm 92 has a central elongated opening 96 having its long axis in the longitudinal direction of the arm and a terminal supporting post 193 on which is mounted a guide pin 195 delimited by flanges 194, 194. The magnetic tape 1 is guided in sliding contact with the guide pin 195. On the upper surface of the tension regulator arm 92, a cam plate 94 formed with a cam groove 93 is attached by a screw 190. The cam plate 94 is mounted with the cam groove 93 in register with the elongated opening 96. The upright engaging pin 97 mounted to one end of the tension regulator rotary arm 61 is introduced into the cam groove 93. As the tension regulator rotary arm 61 is reciprocated by the tension regulator operating lever 49 which in turn is operated by the aforementioned loading lever 17, the tension regulator rotary arm 92 is rotated about the supporting post 91 as the engaging pin 97 is shifted along cam groove 93. A depending engaging pin 99 is provided to the other end of the tension regulator rotary arm 61 for engaging with a stepped cam surface 98 on the mode selector lever 60. When the tension regulator arm 61 has been rotated to the second loading position, the mode selector lever 60 is slid as a function of the selected operating mode of the apparatus so that the pin 99 is engaged with a cam surface section of the cam surface 98 associated with the selected operating mode. In this manner, the arm 61 is turned about arm shaft 62 and the engaging position of the terminal engaging pin 97 of the rotary arm 61 within the cam groove 93 is shifted for causing the tension regulator arm 92 to be rotated as a function of the selected operating mode. It should be noted that the cam groove 93 has an enlarged diameter portion 93a towards the bottom end of the regulator arm 92 and the pin 97 of the tension regulator arm 61 is loosely engaged in the enlarged diameter portion 93a.

To one side of the tension regulator arm 92, the arm is formed with a projecting retainer 102 for retaining one end of a connecting member 101 extended from one end of a tension spring 100, the other end of which is affixed to the chassis plate 8, in such a manner that the arm 92 is biased so as to be turned in the direction of the arrow mark C in FIG. 1 under the force of the tension spring 100 so that the arm acts as tension regulator for placing a predetermined tension on the magnetic tape 1 travelling in the loading state.

Operatively associated with the loading lever 17 adapted for driving the loading lever unit is a reel lock release lever 106 which operates for releasing a reel lock unit 105 which operates in turn to lock the tape supply reel 15 and the tape take-up reel 16 about which the tape 1 is wound and which are provided in the tape cassette 3 mounted in the cassette mounting section. The reel lock lever 106 is in the form of an elongated letter L and provided with elongated openings 109, 110 and 111 at the foremost part of a horizontal lever section 107 and at the upper and lower ends of a vertical lever section 108, said openings having their long axes in the longitudinal direction of the lever 106. Upright supporting pins 112, 113, 114 on the chassis plate 8 are introduced and engaged in these openings for sliding vertically in FIG. 1. An upright engaging pin 115 at the foremost part of the vertical lever section 108 is engaged in a cam groove 116 formed in the first lever section 18 of the loading lever 17. The cam groove 116 is formed as a step in the driving direction of the loading lever 17 and, with reciprocation of the loading lever 17, the reel lock release lever 106 is moved vertically in FIG. 1. The central section of the horizontal lever section 107 of the reel lock release lever 106 is provided with an engaging pin 122 engaging in an opening 121 in a lock pawl mounting element 120 carrying reel lock pawls 118, 119 of the reel lock unit 105 which is provided in the tape cassette 3. When the tape cassette 3 is mounted in position, the lock pawl mounting element 120 is engaged with the pin 122 via opening 121. When the reel lock release lever 106 is moved vertically in FIG. 1, the lock pawl mounting element 120 is moved vertically in unison therewith and the pair of reel lock pawl elements 118, 119 attached to the foremost part of the mounting member performs a switching operation so that the pawl elements are engaged with or disengaged from an engaging ratchet portion 125 formed at the rim of flanges 15a, 16a of the supply and take-up reels 15, 16, respectively.

Figure 6:
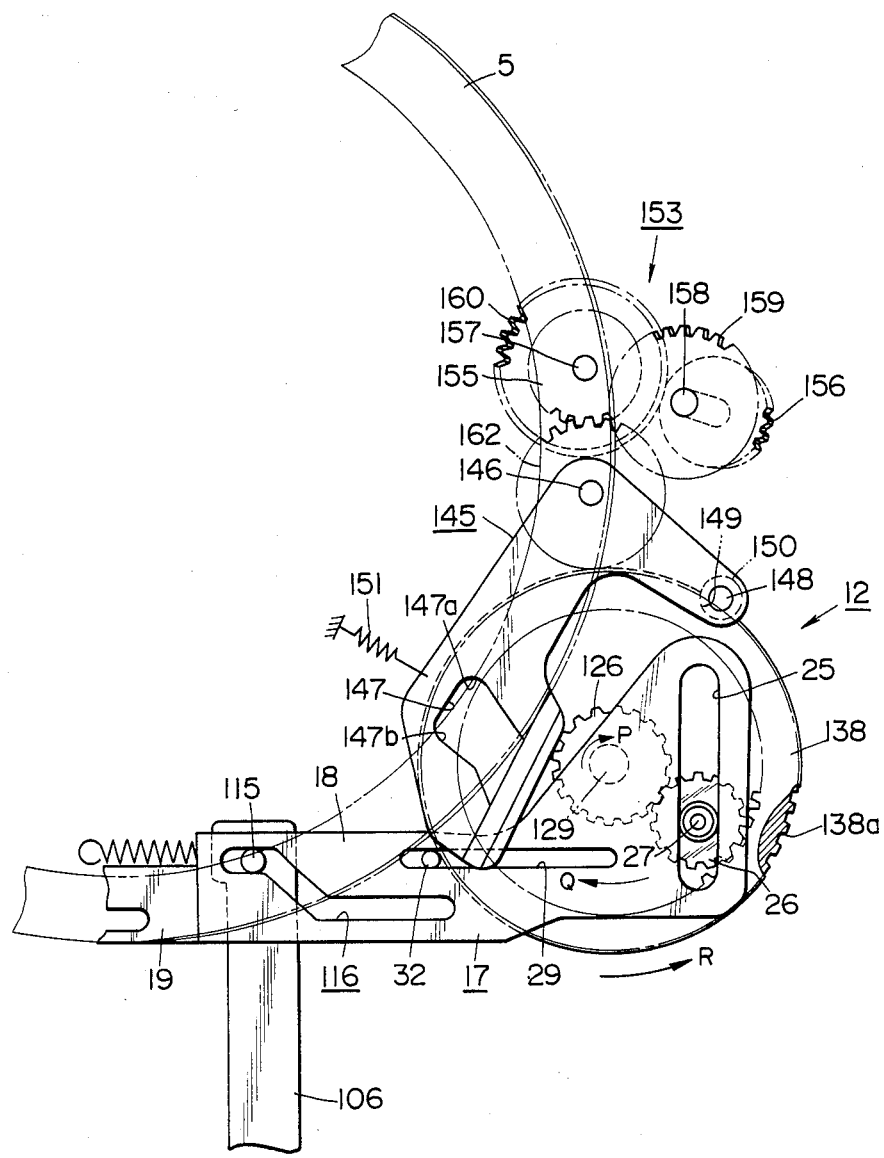
FIG. 6 is a plan view showing a planetary gearing according to the present invention.
Figure 7:
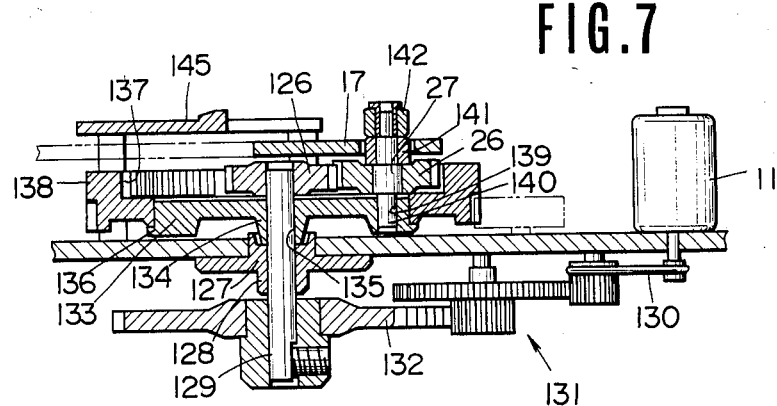
FIG. 7 is a sectional view showing said planetary gearing.

In the apparatus of the present invention, the planetary gearing unit 12 driven by a single electric driving motor 11 is constructed in the manner as described hereinafter and operatively linked with the loading lever 17 and the loading ring 5. As shown in FIGS. 6 and 7, the gearing unit 12 has a sun gear 126 fitted into a cylindrical boss 128 of a bracket 127 affixed to the chassis plate 8. The sun gear is fitted integrally to the foremost part of a driving shaft 129 which is introduced through a cylindrical boss 128 of a bracket 127 attached to the chassis plate 8 and which is rotatably carried with respect to bracket 127. To the lower end of the driving shaft 129 to which is affixed the sun gear 126, there is affixed a gear 132 to which the driving force of the loading electric motor 11 mounted on the chassis plate 8 is transmitted via transmission belt 130 and a connection gearing 131. Thus the sun gear 126 is driven in rotation in accordance with forward or reverse rotation of the loading electric motor 11.

To the driving shaft 129 to which is attached the sun gear 126 as described above, there is rotatably mounted a planet gear mounting plate 133 in the form of a disc, said plate 133 mounting the planet gear 26 and having a central hub 134 and a through-opening 135 adapted for passage of the driving shaft 129. Thus the planet gear mounting plate 133 is mounted for rotation and sliding relative to the driving shaft 129, by that the lower surface of the hub 134 provided with the through-opening 135 for passage of the driving shaft 129 is resting on a receptacle on the upper face of the boss 128 of the bracket 127. A ring gear 138 having upper inner peripheral teeth 137 and resting on the flange 136 of the lower periphery of the mounting plate 133 is mounted for rotation in sliding contact with the mounting plate 133. The planetary gear 26 is mounted on the mounting plate 133 intermediate between the sun gear 126 and the ring gear 138. The planetary gear 26 is rotatably mounted to the gear shaft 27 which has its reduced-diameter portion 140 press-fitted into a throughhole 139 formed in the mounting plate 133. The gear 26 meshes with the sun gear 126 and the ring gear 138 and rotates about the sun gear 126. The gear shaft 27 carrying the planetary gear 26 also carries two cylindrical rolls 141, 142.

In the planetary gearing 12 as described hereinabove, supposing that the driving force is transmitted from the driving motor 11 for causing the sun gear 126 to be rotated in the clockwise direction (in the direction shown by the arrow mark P in FIG. 6), such force is transmitted to the planetary gear 26 as a force which will cause the gear 26 to be rotated about the sun gear clockwise (in the direction shown by the arrow mark Q in FIG. 6), while it is also transmitted to the ring gear 138 as a force which will cause the ring gear 138 to be rotated counterclockwise (in the direction shown by the arrow R in FIG. 6). On the other hand, when the force which will cause the sun gear 126 to be rotated counterclockwise (in the direction opposite to the arrow P in FIG. 6) is transmitted to the sun gear, the force is transmitted to the planetary gear 26 as force which causes counterclockwise rotation (rotation in the direction opposite to the arrow Q) of the planetary gear 26, while it is transmitted to the ring gear 138 as a force causing clockwise rotation (or rotation in the direction opposite to the arrow R in the figure) of the ring gear.

The loading lever 17 is mounted in position with the roll 141 of the gear shaft 27 of the planetary gear 26 of the planetary gearing 12 fitted in the elongated opening 25 formed in the vertical lever section 24 of the loading lever. Thus, when the planetary gear 26 is rotated about the sun gear 126, the loading lever 17 is reciprocated by a distance equal to the diameter of the circular orbit of the planetary gear 26.

On the upper surface of the planetary gearing 12, a switching arm 145 is provided in superposed relation on the ring gear 138. As shown in FIG. 6, the arm 145 has its corner rotatably carried by a stud 146 mounted upright on the chassis plate 8, and has a recessed engaging portion 147 opening towards one side thereof and within the circular orbit of the planetary gear shaft 27 carrying the planetary gear 26. The aforementioned rotation of the planetary gear 26 about the sun gear is inhibited when the upper roll 142 fitted to the upper end of the rotating planetary gear 26 is engaged with the recessed engaging portion 147. The engaging portion 147 has a first engaging part 147a engaged with gear shaft 27 of the planetary gear 26 when the latter is rotated in the forward direction for inhibiting the forward rotation of the planetary gear, and a second engaging part 147b engaging with the gear shaft 27 of the planetary gear 26 when the latter is rotating in the reverse direction for inhibiting reverse rotation of the planetary gear. The opposite side edge of the switching lever 145 has an engaging means 150 comprised of a stud 148 and a roll fitted thereto for engaging with a recess 149 formed on the outer periphery of the ring gear 138. The means 150 of the switching arm 145 is biased by spring means 151 to be turned towards the periphery of the ring gear 138 so that, as the ring gear 138 is rotated and the engaging member 150 reaches the position corresponding to the recess 147 of the ring gear 147, the means 150 is engaged with the recess 147 for inhibiting rotation of the ring gear 138.

The lower outer periphery of the ring gear 138 of the planetary gearing 12 is formed with a gear 152 to which the loading ring 5 is connected through connection gearing 153.

Figure 8:
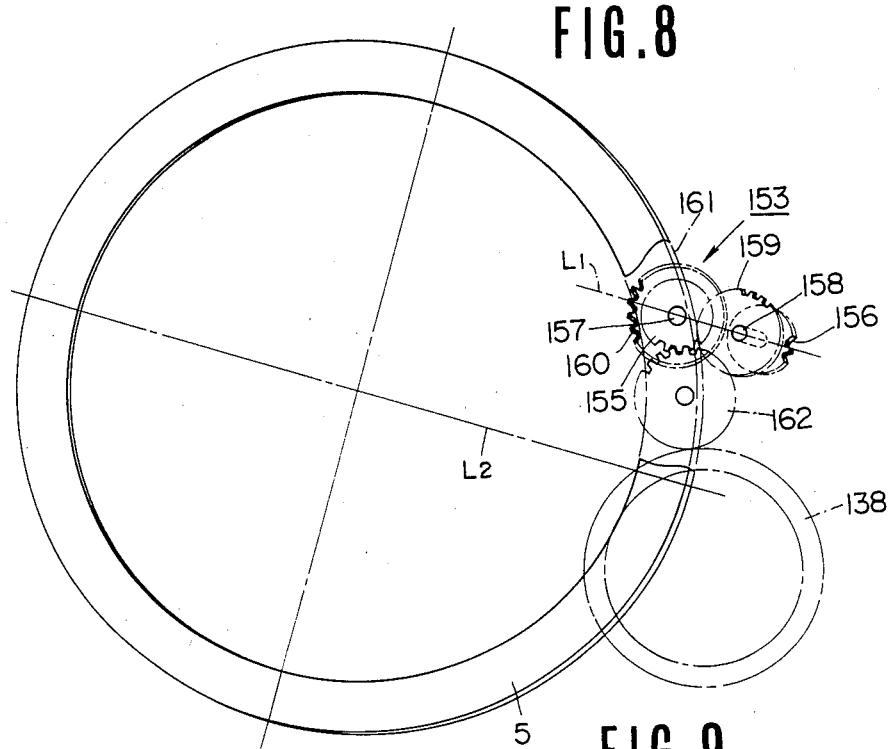
FIG. 8 is a plan view showing the loading ring and the ring gear.
Figure 9:
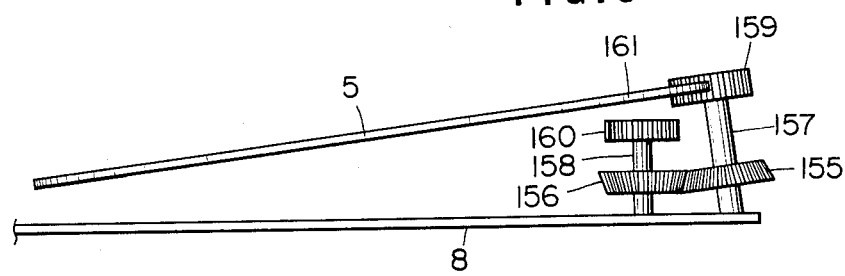
FIG. 9 is a side view showing the loading ring and the ring gear.

It should be noted that the loading ring 5 is mounted at an angle relative to the chassis plate 8 on which the planetary gearing 12 and the associated parts are mounted, in order that the size and mounting space of the ring is minimized and the magnetic tape 1 may be placed around the periphery of the tape guide drum 2 for an augular extent more than 180°. The ring gear 138 of the planetary gear 26 and the loading ring 5 inclined relative to the chassis plate 8 are connected together by a connection gearing 153 constructed as shown in FIGS. 8 and 9. In FIGS. 8 and 9, there are provided a first bevel gear 155 and a second bevel gear 156 meshing with each other. The first bevel gear 155 is mounted on a gear shaft 157 perpendicular to the plane of the loading ring 5 and the second bevel gear 156 is mounted to a gear shaft 158 perpendicular to the chassis plate 8 which is coplanar with the ring 138. The gear shafts 157, 158 are mounted in such a manner that a straight line $L_1$ interconnecting the gear shafts is parallel to a straight line $L_2$ indicative of the maximum inclination of the loading ring 5 relative to the chassis plate 8. Thus the loading ring 5 and the ring gear 138 which are not coplanar with one another may be connected together by having a first spur gear 159 and a second spur gear 160 mounted respectively to the gear shafts 157, 158. It is thus possible to interconnect the loading ring 5 and the planetary gearing 12 by the connection gearing 153 constructed in such a manner that the first spur gear 159 meshes with a spur gear 161 formed on the periphery of the loading ring 5 and the second spur gear 159 meshes with a counter spur gear 159 meshing in turn with a spur gear 138a of the ring gear 138.

Although the loading ring 5 and the planetary gearing 12 are mounted at an angle to each other, the loading ring 5 and the planetary gearing 12 can be connected together by means of the aforementioned connection gearing 153, and the spur gears 161, 138a can be machined easily, resulting in the loading ring 5 and the planetary gearing 12 of higher precision and the connection gearing 153 of smaller and simpler design.

In the circular orbit of the planetary gear 26 of the planetary gearing 12, an engaging pawl piece 166 is provided for facing to the forward end of a cassette lock release lever 165 which is positioned along one side of the cassette mounting section as shown in FIG. 1 and which is adapted for releasing the lock of the cassette holder adapted in turn for holding the tape cassette 3 within the cassette holding section. The release lever 165 is operated in such a manner that, when the planetary gear 26 is rotated along its circular orbit for tape unloading, that is, for withdrawing the tape 1 back into the tape cassette 3, the lever 165 is acted upon by the gear shaft 27 associated with the planetary gear 26 for releasing the lock of the cassette holder. Since it is required that the lock of the cassette holder be released after termination of the tape unloading operation, the cassette lock release lever 165 is so arranged that the planetary gear 26 is driven further for pressuring the cassette lock release lever 165 after the gear 26 is driven for tape unloading.

In the apparatus of the present invention, as shown and described hereinabove, the operation of tape loading, that is, of extracting the magnetic tape 1 along its predetermined travel path, and that of tape unloading, that is, of withdrawing the thus extracted magnetic tape 1 into the tape cassette 3, are hereafter explained.

Before start of unloading the tape 1, with the tape cassette 3 in place within the cassette mounting section, the planetary gear 26 of the planetary gearing 12 is placed at the extreme right position of the ring gear 138, that is, at a position in which a straight imaginary line connecting the gear shaft 12a of the sun gear 126 with the gear shaft 27 of the planetary gear 26 becomes parallel to the longitudinal direction of the loading lever 17 (FIG. 3). The engaging member 150 of the switching arm 145 adapted for switching the operation of the planetary gearing 12 is engaged with the engaging recess 149 of the ring gear 138 for inhibiting rotation of the ring gear. The planetary gear 26 adapted for reciprocating the loading lever 17 is positioned to the extreme right position of the ring gear 138, the loading lever 17 is also at the extreme right position (FIG. 3).

Figure 10:
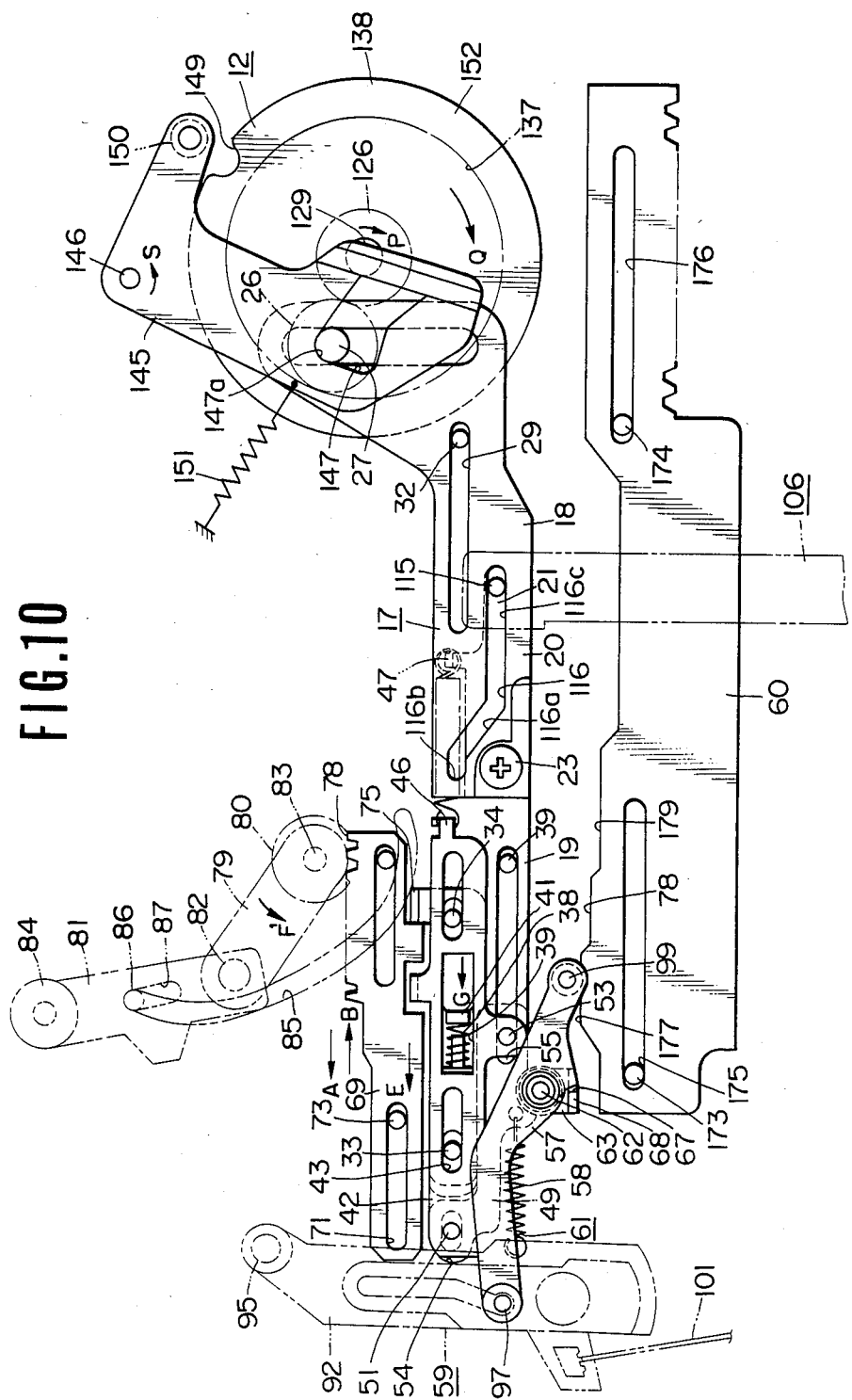
FIG. 10 is a plan view showing the loading lever unit when shifted to the guide position.

Thus the loading lever unit, which is reciprocated by the loading lever 17, has also been shifted towards right in FIG. 3, as indicated by the arrow mark B. Thus the sub-loading lever 42 has been shifted towards right or in the direction of the arrow mark B in FIG. 3 by the operation of the tension spring 48 the one end of which is retained by the first lever section 18 of the loading lever 17. The rack plate 69, actuated by the sub-loading lever 42, has also been shifted towards right or in the direction of the arrow mark B in FIG. 3. The first and second folding guide levers 79, 81 of the folding guide unit shifted by the rack plate 69 are folded about pin 82 so that the guide pin 86 is situated at the bottom end of the folding guide lever guide groove 85, and the guide 20 pole 84 provided to the foremost part of the second folding guide lever 81 is situated for facing to the inner surface of the magnetic tape 1, that is, the tape cassette side surface of the magnetic tape 1 which is situated along the front opening side of the tape cassette 3. Since the sub-loading lever 42 is shifted towards right in FIG. 3, the tension regulator operating lever 49, which is attached to the sub-loading lever 42 and biased towards the foremost part of the sub-loading lever 42 by the tension spring 58, has also been shifted towards right or in the direction of the arrow mark B in FIG. 3. The tension regulator operating arm 61, carried by the operating lever 49 through the medium of the arm shaft 62, has been shifted towards right or in the direction of the arrow mark B in FIG. 3. The tension regulator arm 92, in the cam groove 93 of which is engaged the upright engaging pin 97 on one end of the operating arm 61, has been turned towards the front opening side of the tape cassette 3 or in the direction of the arrow mark D in FIG. 3, with the supporting post 91 as center, by the operation of the tension regulator operating arm 49, in such a manner that the guide pin 95 provided to the foremost part of the tension regulator arm 92 is facing to the inner side or the tape cassette side of the magnetic tape which is situated along the front 20 opening side of the tape cassette 3. Furthermore, when the loading lever 17 is situated at the extreme right position shown in FIG. 3, the upright engaging pin 115 on the foremost part of the vertical section 108 of the reel lock release lever 106 is engaged in an upper cam surface 116b which is contiguous to the left inclined cam surface 116a in FIG. 3 of the cam groove 116 in the first lever section 18 so that the reel lock release lever 106 has been shifted towards tape guide drum 2. With the reel lock release lever 106 thus raised towards the tape guide drum 2, the lock pawl mounting member 120 within tape cassette 3 are also raised thus causing the reel lock pawl elements 118, 119 to be opened apart to engage with the ratchet portions 125 of the tape supply and take-up reels 15, 16 for thereby locking the reels 15, 16. The loading ring 5 is also positioned in the pre-loading rotary position in which the pinch roll 10 and the guide rolls 4, 7 are positioned towards the front side of the tape cassette, as shown in FIG. 10. In the pre-loading state in which the tape cassette 3 is mounted in the cassette holding section as described hereinabove, the start switch, not shown, mounted to the apparatus is actuated for driving the loading motor 11 in the forward direction. The driving force of the motor 11 is transmitted via connection gearing 131 to a drive transmitting gear 132 so that the sun gear 126 is driven into forward rotation as shown by the arrow mark P in FIG. 3. Since the engaging member 150 of the switching arm 145 is engaged at this time in the engaging recess 149 of the ring gear 138, the ring gear remains deactivated and only the planetary gear 26 starts to be rotated forward in the direction of the arrow Q in FIG. 3. With the planetary gear 26 thus rotating forward, the gear shaft 27 of the gear 26 causes the loading lever 17 to be shifted forward in the direction of the arrow A in FIG. 3, while being shifted vertically in FIG. 3 within the elongated opening 25 formed in the vertical section 24 of the loading lever 17. When the loading lever 17 starts to be shifted forwards in the direction of the arrow A, the engaging pin 115 of the reel lock release lever 106, so far engaged in the upper cam surface 116b of the cam groove 116 of the loading lever 117 is moved along the inclined cam surface 116a. Thus, the reel lock release lever 106 is gradually shifted in the direction of the arrow D in FIG. 3 so that the lock pawl mounting member 120 within the tape cassette 3 is moved away from the tape supply reel 15 and the tape take-up reel 16 for opening the reel lock pawl elements 118, 119 mounted to the lock pawl mounting member 120. When the engaging pin 115 reaches the lower cam surface 116c of the cam groove 116, the reel lock pawl elements 118, 119 are disengaged from the engaging ratchet portions 125 of the flanges 15a, 16a to release the reel lock to permit free rotation of the supply and take-up reels 15, 16 about their reel blocks. With the reel lock of the tape cassette 3 thus released, the sub-loading lever 42, the folding guide operating lever 35 and the tension regulator operating lever 49 are shifted further forwards as one unit in the direction of the arrow A in FIG. 3.

It should be noted that, since the sub-loading lever 42 is slidably mounted with the upright guide shafts 33, 34 on the second lever section 19 of the loading lever 17 inserted into elongate openings 43, 44, and the lever 42 is connected to the loading lever 17 via tension spring 48, the sub-loading lever 42 remains unactivated until such time that the loading lever 17 is shifted forwards and the lever 42 is no longer subjected to the force of the spring 48. This accounts for the above described sequential operation of the reel lock release of the tape cassette 3 and the forward movement of the levers 35, 42, 49.

As the planetary gear 26 is rotated further forwards along its circular orbit and the loading lever 17 is shifted forwards until the engaging pin 115 of the reel lock release lever 106 reaches the lower cam surface 116c of the cam groove 116, the upright guide shafts 33, 34 on the second lever section 19 of the loading lever 17 act to pressure the left-hand sides of the openings 43, 44 of the sub-loading lever 42 and the left-hand sides of the openings 36, 37 of the folding guide operating lever 35 when seen in FIG. 3. The tension regulator operating lever 49, which is movably mounted by having the guide pins 51, 53 loosely introduced into the elongate openings 54, 55 thereof and which is also mounted to the sub-loading lever 42 through the medium of the tension spring 58 is also acted upon so that the left sides of the openings 54, 55 when seen in FIG. 3 are pressured by the guide pins 51, 53. Thus the subloading lever 42, the folding guide operating lever 35 and the tension regulator operating lever 49 are moved forwards as one with the loading lever 17. When the levers 42, 35, 49 are moved forwards in the direction of the arrow A in FIG. 3 as one with the loading lever 17, thrust projection 75 of the folding guide operating lever 35 abuts on the projection 77 of the rack plate 69 so that the rack plate is pressured by the folding guide operating lever 35 and shifted in the same direction E in FIG. 10 as the forward movement of the shifting lever 17 with the supporting pins 73, 74 on the chassis plate 8 disposed in the elongate openings 71, 72 as guide. When the rack plate 69 is moved in this manner, a gear 80 mounted to the bottom end of the first folding guide lever 79 of the folding guide unit and meshing with rack gear 78 of the rack plate 69 is turned so that the first folding lever 79 fast with the gear 80 is also turned in the direction F in FIG. 3. When the first folding guide lever 79 is turned in this manner, the second folding guide lever 81, rotatably connected to the foremost part of the lever 79, travels along one side of the guide drum 2 and towards a point remote from the cassette mounting section so as to be extended from the first folding guide lever 71 and follow up with rotation of the first lever 79. With the second folding guide lever 81 travelling in this manner, the magnetic tape 1, wound about the upright terminal guide pole 84 on the lever 81 is extracted from the tape cassette 3 and brought into sliding contact with the periphery of the tape guide drum 2. With further forward rotation of the planetary gear 26, the loading lever 17 is moved forwards, until the movement of the tension regulator operating lever 49 is inhibited by abutment on the stopper 50. The second folding guide lever 81 is locked as shown in FIG. 10 when it assumes a second position with the foremost part of the terminal upright guide pole 84 abutting on and engaging with the groove 89 of the stopper 88. Since the folding guide operating lever 35 is biased by coil spring 38 in the direction of the arrow mark G in FIG. 10, the rack plate 69 is pressured by the thrust projection 75 of the folding guide operating lever 35, so that the first and second levers 79, 81 are kept in abutment with the stopper 88 in the extended state.

As the planetary gear 26 is rotated forwardly along its circular orbit as described hereinabove for forwardly shifting the loading lever 17 in the direction of the arrow A in FIG. 3 and bringing the first and second folding guide levers 79, 81 from the first unloading position in which they remain collapsed to the second loading position in which they are extended along the one side of the tape guide drum 2, the tension regulator 59 is simultaneously shifted from the first unloading position to the second loading position. Thus, when the reel lock of the tape cassette 3 is released as described hereinabove, the loading lever 17 is moved in the direction of the arrow A in FIG. 3, and the levers 42, 35 and 49 are moved as one with the loading lever 17, the tension regulator operating arm 61 linked to the tension regulator operating lever 49 via arm shaft 62 is also moved in the direction of the arrow A in FIG. 3. When the tension regulator operating arm 62 is moved in this manner, the upright engaging pin 97 on one end of the operating arm 62 engaging in cam groove 93 of the tension regulator arm 92 causes the tension regulator arm 92 to be turned from the first unloading position in which the arm 92 has its foremost part lying towards the front opening side of the tape cassette 3 to a second loading position in which the arm 92 is positioned upright and extended along the side of the apparatus, as the pin 97 is guided to travel from the foremost towards the bottom ends of the cam groove 93. The magnetic tape 1 is pulled by the foremost guide pin 95 of the tension regulator arm 92 so as to be extracted to the predetermined tape route.

Thus, according to the present invention, reciprocating movement of the loading lever 17 brought about by forward revolution of the planetary gear 26 activates the loading lever unit for shifting the folding guide unit and the tension regulator 59 from the first unloading position to the second loading position to complete the first half of the loading operation in which the tape 1 is pulled from the position within tape cassette 3 to the predetermined tape route.

As described hereinabove, when the folding guide unit and the tension regulator 59 are shifted from the first to the second positions, the planetary gear 26 is revolved in the forward direction shown by the arrow Q in FIG. 3 and towards the left side of the ring gear 138 as shown in FIG. 10, until the gear shaft 27 engages the first engaging part 147a in the recess 147 of the switching arm 145. Forward revolution of the planetary gear 26 is inhibited by abutment with the first engaging part 147a. However, since the gear 26 tends to be revolved further in the forward direction, it acts to pressure the switching arm 145 for causing counterclockwise rotation of the switching arm 145 with the stud 146 as center as indicated by the arrow S in FIG. 10 and against the bias of the spring 151. In this manner, the member 150 of the switching arm 145 is disengaged from the recess 149 of the ring gear 138 to permit the ring gear 138 to be rotated in the forward direction indicated by the mark R in FIG. 11.

Figure 11:
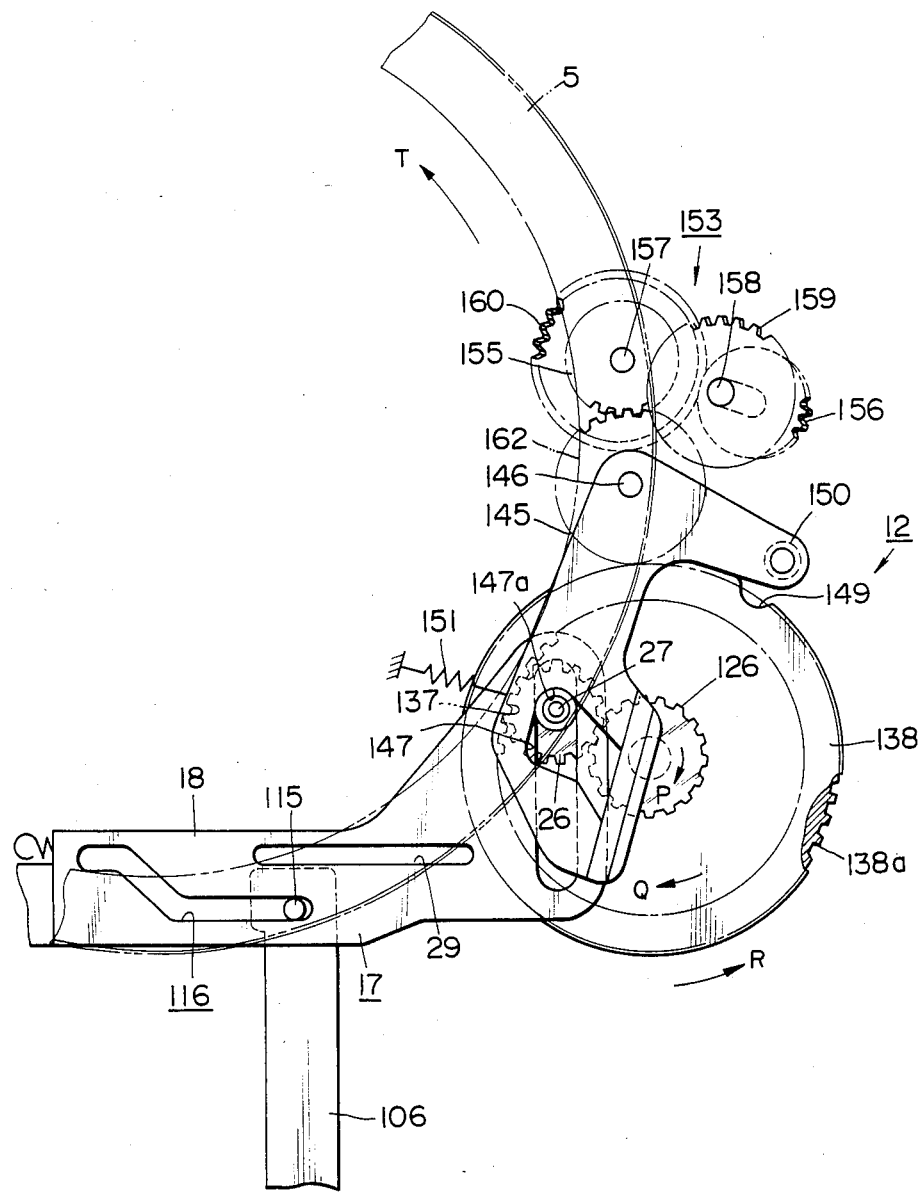
FIG. 11 is a plan view showing the ring gear of the planetary gearing when rotated in a forward direction.
Figure 12:
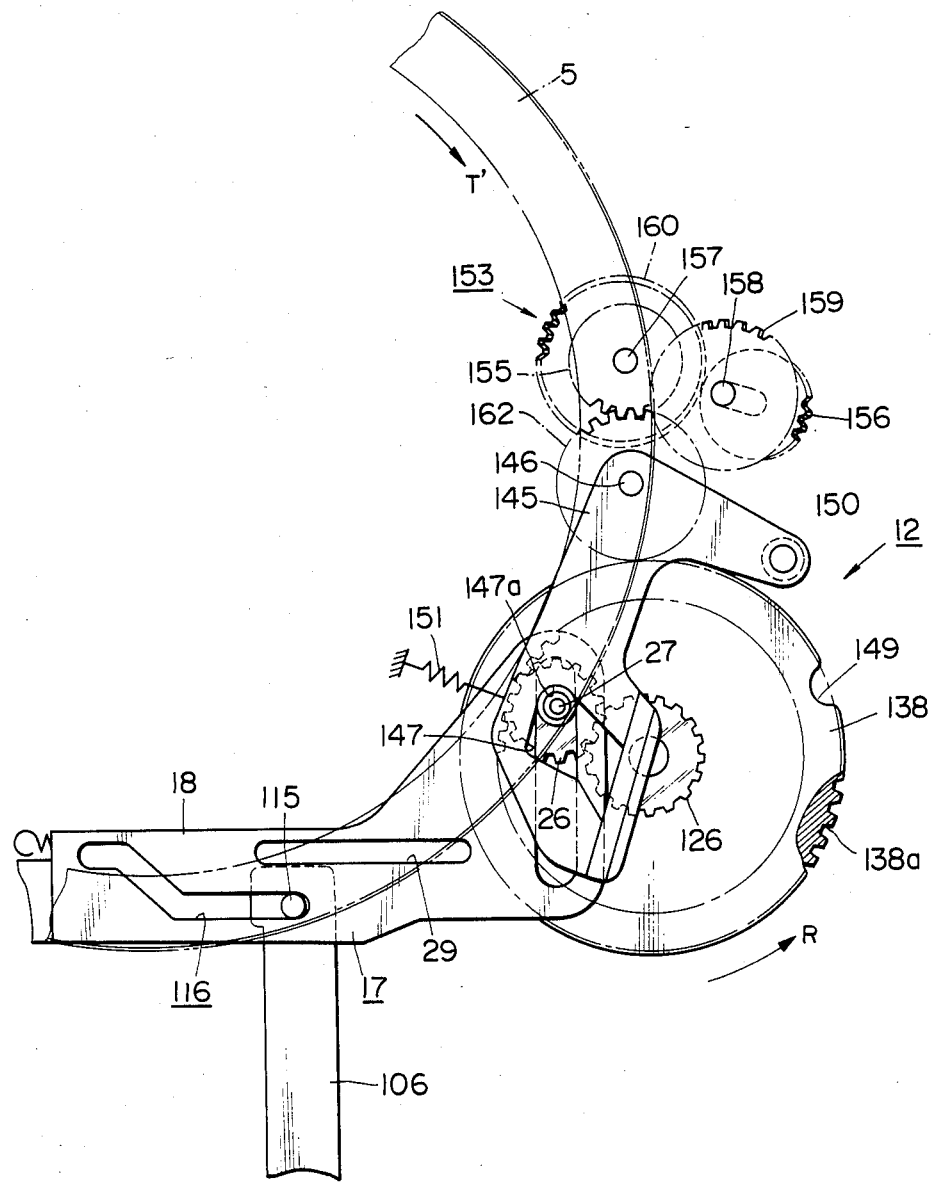
FIG. 12 is a plan view showing the planetary gearing when the has completed its forward revolution.

As the forward revolution of the planetary gear 26 is inhibited, and only the ring gear 138 is turned in the forward direction as indicated by the arrow R in FIG. 11, rotation of the ring gear 138 is transmitted to the loading ring 5 so that the ring 5 is turned in the forward direction indicated by the arrow T in FIG. 11. With the ring gear 138 rotating in the forward direction as indicated by the arrow R in FIG. 11 and the loading ring 5 rotating in the forward direction, the tape 1 is placed around the guide rolls 4, 7 and the pinch roll 10 provided to the ring 5 and thus placed around the tape guide drum 2. It should be noted that the rotary arm 6 provided with the guide roll 7 is turned towards the outside of the loading ring 5 during forward rotation of the loading ring 5 for pulling out the tape 1 transversely of the loading ring 5. As the ring gear 138 is turned through about 330° in the direction of the arrow R in FIG. 12, the loading ring 5 is turned to a position facing the capstan 9 to complete the loading of the magnetic tape 1 along the predetermined tape route as shown in FIG. 1. At this time, the operation of the loading electric motor 11 ceases for terminating the driving of the planetary gearing 12 and the ring gear 138. Upon termination of the loading operation, the loading ring 5 is locked by locking means provided to the chassis plate 8 so as to keep the magnetic tape 1 loaded along the predetermined route. At this time, an operating button provided to the apparatus, such as recording-reproducing button, may be actuated for effecting recording or reproduction with the aid of the rotary magnetic head provided to the tape guide drum 2.

As in the case of the prior-art magnetic recording-reproducing apparatus, a recording-reproducing magnetic head 170 for voice signals, a recording-reproducing magnetic head 171 (CTL head) for reference signals and an erase head 172 are also provided in the present apparatus so as to be in sliding contact with the magnetic tape 1 travelling along the predetermined tape route.

It should be noted that the tension regulator 59 employed in the apparatus of the present invention may be turned by the operation of the mode selector lever 60 so as to be shifted to a position corresponding to the selected operating mode of the apparatus, with the magnetic tape 1 in the loaded state, as described hereinabove, for placing a tension on the magnetic tape in accordance with respective operating modes of the apparatus. The mode selector lever 60 that may be variably shifted in accordance with recording-reproducing mode, stop mode, rapid feed and rewind mode or loading mode, is provided parallel to the loading lever 17 and along one side edge of the lever 17 facing to the cassette mounting section. In order that the lever may be variably slid in accordance with the operation of the mode selecting means, it is mounted by the upright guide pins 73, 74 on the chassis plate 8 inserted in elongate openings 175, 176 in the lever 60 having their long axes in the longitudinal direction of the lever 60, in such a manner that the lever may be slidable horizontally in FIG. 13. The one side edge of the mode selector lever 60 is formed with a stepped cam surface 98 engaged by the pin 99 formed on the extreme end of the tension regulator operating arm 61, as mentioned hereinabove. Looking from the side of the tension regulator arm 92, the cam surface 98 is formed by a first cam step 177 of the maximum height corresponding to the recording reproducing mode, a second cam step 178 of the intermediate height corresponding to the stop mode, and a third cam step 179 of the minimum height corresponding to the rapid feed and rewind mode and the loading mode, these three steps 177, 178, 179 being contiguous to one another via intermediate inclined surfaces.

After termination of loading of the magnetic tape 1, the tension regulator operating lever 49 is inoperative, as mentioned hereinabove, and the tension regulator operating arm 61 alone is turned about arm shaft 62 by sliding operation of the mode selector lever 60. When the loading comes to an end and the mode selector lever 60 is not actuated, the pin 99 at the other end of the tension regulator operating arm 61 is engaged at the right part of the third cam step 179, the pin 97 is engaged at the lesser diameter zone 93b of the cam groove 93 and the tension regulator arm 92 is maintained at the solid-line position in FIG. 13. When the recording-reproducing mode is selected, mode selector lever 60 is shifted in the direction of the arrow H in FIG. 14 and the pin 99 at the other end of the tension regulator operating arm 61 rides on the first cam step 177, so that the arm 61 is turned in the direction of the arrow I in FIG. 14 against resiliency of the coil spring 65. The engaging pin 97 is loosely engaged in the larger diameter zone 93a at the bottom end of the cam groove 93 of the tension regulator arm 92 as shown in FIG. 14. The tension regulator arm 92 is no longer restrained by the tension regulator operating arm 61 and may be turned about the supporting shaft 91 in dependence upon the tension generated in the travelling tape 1. The arm 92 is biased to rotate under the force of tension spring 100 in dependence upon the tension placed on the travelling tape 1. The braking force of a braking belt 181 of the tape supply reel block 13, the one end of which is engaged at an intermediate portion of the arm 92 is suitably adjusted as a function of tension regulator arm rotation. In this manner, the rotational speed of the supply reel 15 is controlled for maintaining a constant tension on the travelling tape 1. Thus the unit described above operates as tension regulator.

When the stop mode is selected, the engaging pin 99 at the other end of the tension regulator rotary arm 61 is engaged with the second cam step 178 of the mode selector lever 60 and lifted, and the arm 61 is turned against the force of coil spring 65 so that the terminal engaging pin 97 is engaged in the lesser diameter portion 93b of the cam groove 93 in the tension regulator arm 92. Thus the arm 92 is shifted to a position shown by the dotted chain line in FIG. 13 so that no load is placed on the magnetic tape 1 slidingly contacted with the terminal guide pin 95 of the tension regulator arm 92. In this manner, the tension regulator 59 employed in accordance with the present apparatus may be turned by the mode selector lever 60 for loosening the tape in the loading state in the stop mode for affording protection of the magnetic tape 1.

The tape unloading operation, that is, the operation in which the tape 1 loaded along the predetermined tape route, is withdrawn into the tape cassette 3, is hereafter explained.

Figure 15:
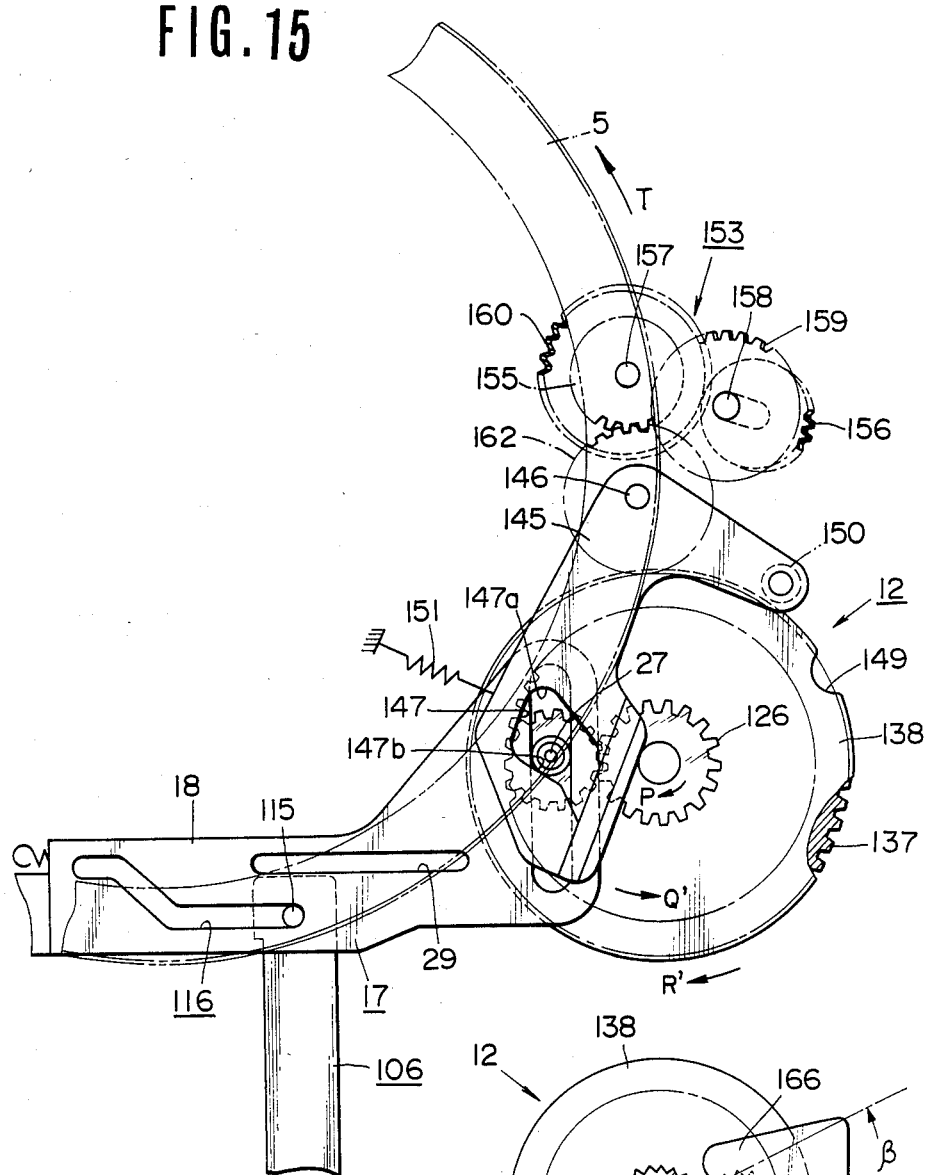
FIG. 15 is a plan view showing the planetary gearing during unloading rotation of the loading ring, the ring gear being rotated in reverse.

Starting from the loaded state shown in FIG. 1, unloading means such as eject button is actuated for driving the loading electric motor 11 in reverse, so that the sun gear 126 is driven in reverse, that is, in the direction opposite to the direction of the arrow P in FIG. 10. With the sun gear 126 driven in reverse, the planetary gear 26, the gear shaft 27 of which has been engaged in first engaging part 147a of the recess 147 of the switching arm 145, is revolved about sun gear slightly in the direction of the arrow Q until it is stopped by the second engaging part 147b to be thus inhibited against such revolution in reverse. Thus, only the ring gear 138 is allowed to rotate in reverse in the direction shown by the arrow Q in FIG. 15. When the ring gear 138 alone is revolved in reverse while the revolution of the planetary gear 26 is inhibited, rotation of the ring gear 138 is transmitted through connection gearing 153 to the loading ring 5 which is revolved in reverse in the direction of the arrow T in FIG. 15. During the revolution of the loading ring 5 in reverse, the tape winding side reel block 14 is rotated for taking up the tape 1 on the tape winding reel 16. The tape 1, so far passed over pinch roll 10 and guide rolls 4, 7 provided to the loading ring 5 and wound about tape guide drum 2, is taken up on the tape winding reel 16, as it is disengaged from the periphery of the guide drum 2. When the ring gear is rotated through about 330° in reverse, that is, in the direction opposite to the loading direction, as mentioned hereinabove, the loading ring 5 alone is in the unloading position, while the loading lever 17 is yet in the loading position and the folding guide unit is extended while the tension regulator 59 is in the second upright position in which it has pulled out the magnetic tape 1 to its predetermined route.

Figure 16:
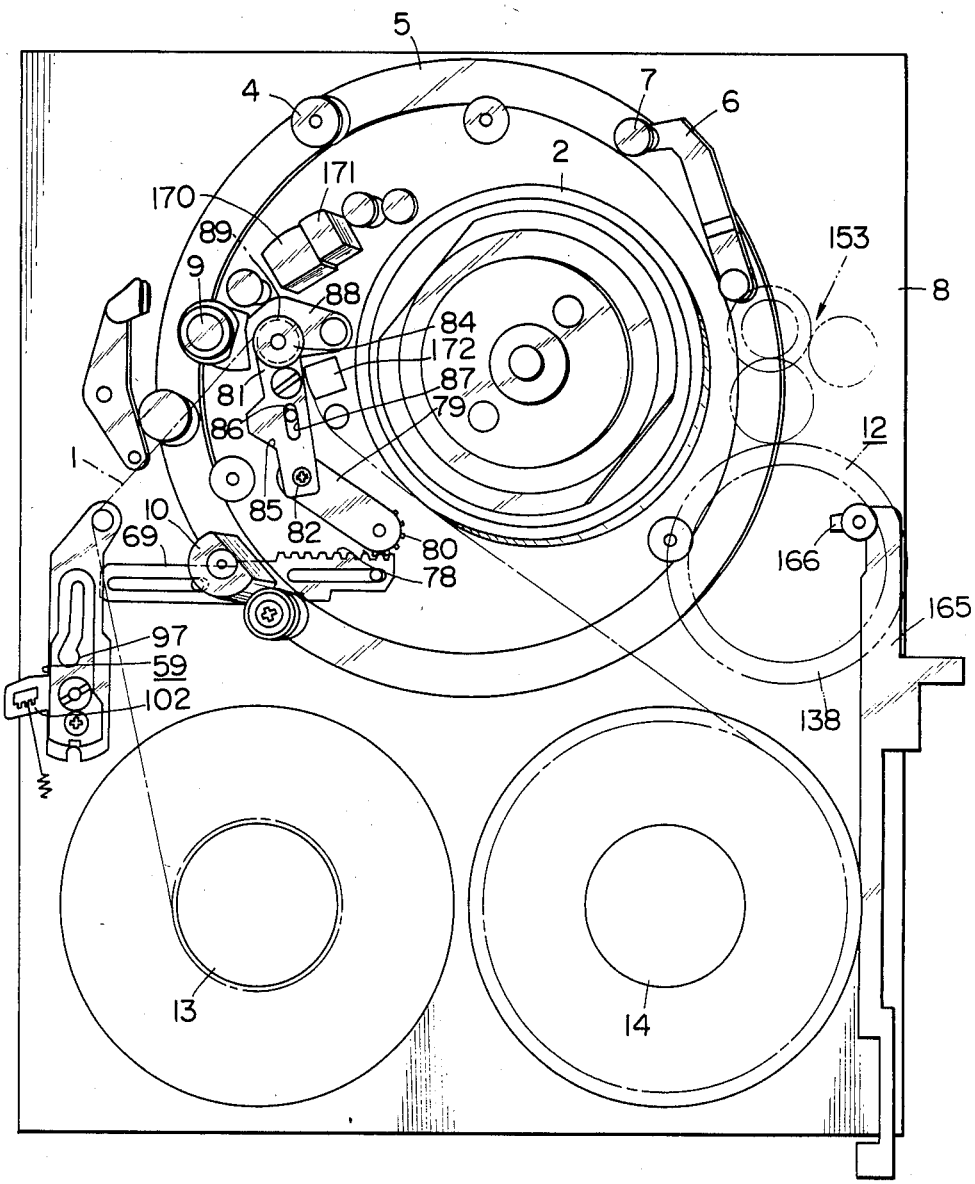
FIG. 16 is a plan view showing the loading gear in the unloading state.

When the loading ring 5 reaches its loading position shown in FIG. 16, the engaging means 150 of the switching arm 145 is engaged in the recess 149 of the ring gear 138 to terminate the revolution of the ring gear 138 in reverse. When the reverse revolution of the ring gear 138 is terminated in this manner, the reverse torque of the sun gear 126 is transmitted to the planetary gear 26, so that the gear shaft 27 so far engaged in the second engaging part 147b of the recess 147 of the switching arm 145 rides on a raised part 147c adjacent to the second engaging part 147b. In this manner, the gear 26 clears the recess 147 and only the planetary gear 26 is rotated in reverse or in the direction opposite to that shown by the arrow Q in FIG. 6. When the planetary gear 26 is rotated in this manner in reverse, the loading lever 17 is receded as indicated by the arrow B in FIG. 10. When the loading lever 17 is receded in this manner, the sub-loading lever 42 is also receded as indicated by the arrow B in FIG. 10 under the traction of the tension spring 48 and the thrust projection 76 provided to the sub-loading lever 42 abuts on projection 77 of the rack plate 69. As the planetary gear 26 is rotated in reverse, and the sub-loading lever 17 receded, the sub-loading lever 42, the folding guide operating lever 35 and the tension regulator operating lever 49 are receded in the direction of the arrow B in FIG. 10 as one with the loading lever 17. When the levers 42, 35, 49 are receded as indicated by the arrow B in FIG. 10 as one with the loading lever 17, rack plate 69 is pushed in the same direction by the thrust projection 76 of the sub-loading lever 42, and the rack plate 69 is shifted in the direction in which the loading lever 17 is receded, that is, in the direction opposite to that indicated by the arrow E in FIG. 10, with the upright supporting pins 73, 74 of the chassis plate 8 engaging in the elongated openings 71, 72 and serving as guide. When the rack plate 69 is shifted in this manner, the gear 80 provided to the bottom end of the first folding guide lever 79 of the folding guide unit and meshing with rack gear 78 of the rack plate 69 is turned clockwise in FIG. 10 and the first folding guide lever 79 fast with the rotary gear 80 is turned in the direction of the arrow F in FIG. 10. When the first folding guide lever 79 is turned in this manner, the second folding lever 81 turnably connected to the forward end of the lever 79 is shifted from one side of the guide drum 2 towards the cassette mounting section as it is collapsed from its extended state onto the first folding guide lever 79 with the guide pin 86 being guided in the folding guide lever guide groove 85 provided to the chassis plate 8. When the second folding guide lever 81 is shifted as indicated above, the magnetic tape 1 wound about the upright guide pole 84 of the lever 81 is receded and taken up about the winding reel 16 in the tape cassette 3.

As the first and second folding guide levers 79, 81 of the folding guide unit are folded as indicated above, the tension regulator 59 is also shifted simultaneously from its second loading position to the first unloading position. Thus the tension regulator rotary arm 61 is also shifted in the direction of the arrow B in FIG. 10 as a result of the tension regulator operating lever 49 receding as one with the loading lever 17. When the tension regulator arm 92 is shifted as indicated above, the upright engaging pin 97 of the rotary arm 61 engaged in cam groove 93 of the tension regulator arm 92 is engaged in the lesser diameter portion 93b of the cam groove 93 for turning the tension regulator arm 92 from the second or loading position to the first or unloading position shown in FIG. 3. This terminates the unloading operation, that is, the operation of withdrawing the tape 1 from its predetermined route into the tape cassette 3. Upon termination of unloading of the magnetic tape 1, the planetary gear 26 is not returned to the starting position shown in FIG. 3, but it is being rotated in reverse, in such a manner that the upright engaging pin 115 of the vertical section 108 of the reel lock release lever 106 is located somewhere intermediate a lower cam surface 116c and the inclined cam surface 116a of the cam groove 116 provided to the first lever 18 of the loading lever 17, and the reel lock release lever 106 is inoperative so that the reel lock pawl elements 118, 119 of the tape cassette 3 are inoperative. That is, the reels 15, 16 of the tape cassette 3 remain in the unlocked state during tape unloading. When the planetary gear 26 is rotated further in reverse for receding the loading lever 17, the engaging pin 115 of the reel lock release lever 106 clears the inclined cam surface 116a of the cam groove 116 to ride on the upper cam surface 116b. Thus the lever 106 is raised towards the guide drum 2 for raising the lock pawl mounting member 120 in the tape cassette 3 and opening the reel lock pawl elements 118, 119 so as to engage the reel lock pawl elements 118, 119 in the engaging portions 125 of the tape supply and winding reels 15, 16 and to lock the reels 15, 16. At this time, the planetary gear 26 has been returned to its starting position shown in FIG. 3.

When the planetary gear 26 is returned to the loading starting position shown in FIG. 3, the loading lever 17 is at the extreme right position in FIG. 3, so that the sub-loading lever 42 is pulled by the tension spring 48 and the projection 77 of the rack plate 69 is pressured and held by the thrust projection 76 of the sub-loading lever 42 for inhibiting movement of the rack plate 69 and actuation of the folding guide unit. Similarly, the tension regulator operating lever 49 is biased by tension spring 58 towards the foremost part of the sub-loading lever 42 for inhibiting movement of the tension regulator 59 and preventing untimely extraction of the magnetic tape 1.

Figure 17:
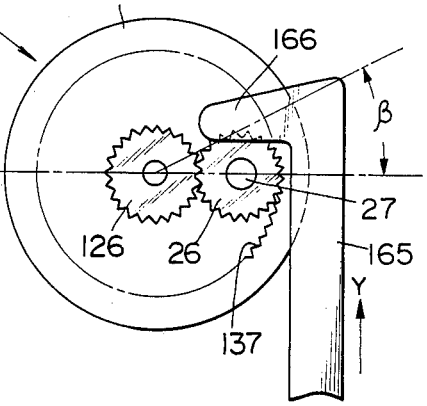
FIG. 17 is a plan view showing the cassette lock release lever being released by the planetary gearing.

During its reverse rotation, the planetary gear 26 is designed for making an additional reverse rotation of a preset angle $\beta$ from the starting position of FIG. 3, as shown in FIG. 17. By said additional rotation of the preset angle $\beta$, the cassette lock release lever 165, whose engaging pawl piece 166 is engaged with gear shaft 27 of the planetary gear 26 in said start position, is shifted in the direction of the arrow mark Y in FIG. 17. Then, locking of the cassette holder is released and the tape cassette 3 is ready to be extracted from the cassette mounting section. When the planetary gear 26 has been rotated in reverse by said preset angle $\beta$, motor 11 is driven in the forward direction for turning the planetary gear 26 in the forward direction through sun gear 126. When the gear 26 is returned to the starting position shown in FIG. 3, the operation of the motor ceases for completing the unloading operation.

Since locking of the cassette 3 is released to permit its extraction only after the tape 1 is rewound in the tape cassette from its predetermined route, untimely extraction of the tape cassette 3 out of the cassette holder through inadvertent operation in the course of tape rewinding is prevented for assuring a trouble-free tape rewinding operation.

It should be noted that, since the additional stroke is provided for the reverse rotation of the planetary gear 26 for releasing the cassette lock release lever 165, and the loading lever 17 is subjected to a slight movement in the direction of the arrow A in FIG. 3 during the additional reverse partial revolution of the planetary gear, the profile of the cam groove 116 or the mounting mode of the sub-loading lever 42 to the loading lever 17 need be selected in such a manner that the reel lock release lever 106 or the sub-loading lever 42 is not operated by movement of the loading lever 17. It is preferred that the cassette lock release lever 165 be provided at right angles with the loading lever 17 so that the effect of the movement of the planetary gear 26 aimed at shifting the cassette lock release lever 165 may be eliminated substantially.

Figure 18:
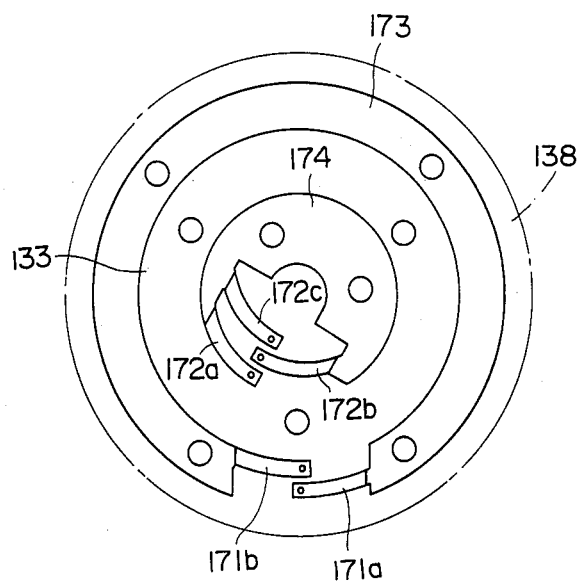
FIG. 18 is a plan view showing a contactor of a switch unit controlling the rotation of a driving electric motor pertaining to the present invention.
Figure 19:
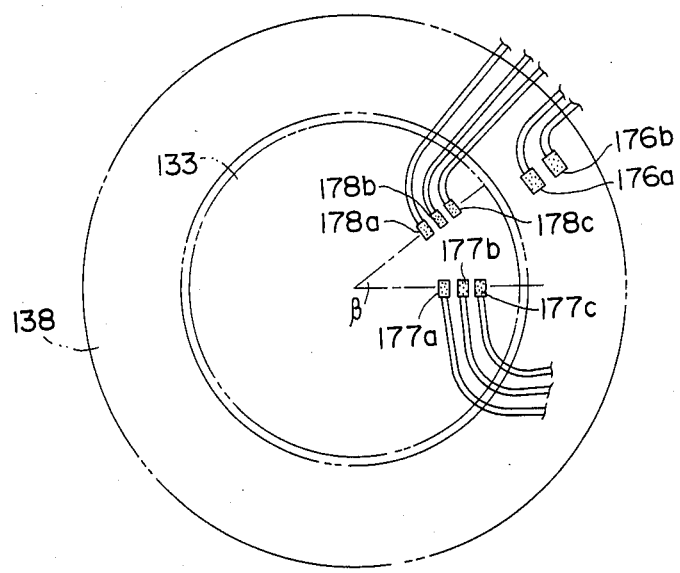
FIG. 19 is a plan view showing a switch pattern of the switch unit.

It should be noted that the operation for stopping or reversing the operation of the driving motor 11 adapted for driving the loading ring 5 and the planetary gearing 12 adapted in turn for reciprocating the loading lever 17 is effected by a switching unit provided between the chassis plate 8 and the planetary gearing 12. The switching unit is comprised of a pair of first contactors 171a, 171b formed on the lower surface of the ring gear 138 of the planetary gearing 12 opposite to the chassis plate 8 as shown in FIG. 18, and a set of second contactors 172a, 172b, 172c formed on the lower surface of the planetary gear mounting plate 133 opposite to the chassis plate 8, as shown in FIG. 18. The first contactors 171a, 171b are integrally connected in a facing relation to each other to both ends of an annular connecting piece 173 made of an electrically conductive metal strip and corresponding in profile to the outside perimeter of the ring gear 138, and are mounted to the lower surface of the ring gear 138 through the medium of the connecting piece 173. The second contactors 172a, 172b, 172c are integrally connected to both ends of an annular connecting piece 174 made of an electrically conductive metal sheet or strip and corresponding substantially to the outside perimeter of the mounting plate 133, so that the two contactors 172a, 172c face to the contactor 172b. When the ring gear 138 and the mounting plate 133 are made of metal or the like conducting material, the first contactors 171a, 171b as well as the second contactors 172a, 172b, 172c need be mounted with interposition of suitable insulating material. As shown in FIG. 19, ring gear end position sensing switch patterns 176a, 176b are formed on the chassis plate 8 as by pattern printing for sensing the rotational end positions of the ring gear 138. Similarly, start position sensing switch patterns 177a, 177b, 177c and reversing position sensing switch patterns 178a, 178b, 178c are formed on the chassis plate 8 as by pattern printing for sensing the rotation start position and the reverse position of the planetary gear 26, respectively, said planetary gear 26 making a revolution on a circular orbit as one with the planetary gear mounting plate 133. The end position sensing switch patterns 176a, 176b for sensing the end position of the ring gear 138 are provided on the ring gear 138 at positions slidingly contacting with the first contactors 171a, 171b when the ring gear 138 has completed its partial forward revolution to complete the winding of the magnetic tape 1 about the tape guide drum 2 by the medium of the loading ring 5. The arrangement is so made that, when the ring gear 138 reaches the above position, an electrical connection across the switch patterns 176a, 176b is established by means of the first contactors 171a, 171b.

The switch patterns 177a, 177b, 177c for sensing the start position of the planetary gear 26 are located so as to be slidingly connected with the second contactors 172a, 172b, 172c mounted on the planet gear mounting plate 133. The reversing position sensing switch patterns 178a, 178b, 178c are located for slidingly contacting with the second contactors 172a, 172b, 172c when the planetary gear 26 reaches the position the angle $\beta$ past its start position for releasing the cassette lock release lever 165 as shown in FIG. 17. The arrangement is so made that, when the planetary gear 26 reaches the aforementioned positions, an electrical connection is established across the switch patterns 177a, 177b, 177c; 178a, 178b, 178c by means of the second contactors 172a, 172b, 172c.

It is now supposed that the driving motor 11 is rotated forward during loading and the planetary gear 26 is driven forward along its circular orbit until it is engaged in the recess 147 of the switching lever 145, the ring gear 138 being then driven forwardly for causing rotation of the loading ring 5 to a position adapted for completing the rotation of the magnetic tape 1 about the tape guide drum 2. When the electrical connection is established at this time across the first contactors 171a, 171b and the end position sensing switch patterns, a stop signal is entered in the driving circuit of the driving motor 11 for stopping the driving motor 11 and terminating the loading operation. It is also supposed that, during unloading, the driving electric motor 11 is driven in reverse, the ring gear 138 is driven first in reverse to release the winding of the magnetic tape 1 about the tape guide drum 2, the engaging member 150 of the switching arm 145 engaging in the recess 149 of the ring gear 138 and the ring gear 138 being returned to its start position. It is also supposed that the planetary gear 26 is rotated in reverse for returning the loading lever 17 and the gear 26 is rotated in reverse by the excess stroke of the angle β past said start position for releasing the cassette lock release lever 165, the second contactors 172a, 172b, 172c then slidingly contacting with the reverse position sensing patterns 178a, 178b, 178c for establishing the electrical connection across these patterns 178a, 178b, 178c. A drive reversing signal is then entered in the driving circuit of the driving electric motor 11 so that the driving motor 11 so far driven in reverse is now driven forwardly. When the motor 11 is driven forwardly so that the planetary gear 26 is driven forwardly and the second contactors 172a, 172b, 172c are slidingly contacted with the start position sensing switch patterns 176a, 176b, 176c for establishing an electrical connection across these switch patterns 176a–176c, a stop signal is entered in the driving circuit of the driving electric motor 11 for stopping the motor 11. Thus the unloading operation is terminated with the planetary gear 26 being restored to its starting position.

By providing the switch unit between the planetary gearing 12 and the chassis plate 8 for controlling the driving of the loading motor 11, the microswitches employed in the prior-art apparatus for sensing the position of the tension regulator or the predetermined rotational positions of the loading ring may be dispensed with, thus saving the space for mounting the switch unit and reducing the size of the apparatus.

In the magnetic recording and reproducing apparatus of the present invention, as described hereinabove, the magnetic tape unloading operation is performed in two stages, namely, the first stage of unloading the magnetic tape from the tape guide drum, and the ensuing second stage of unloading the tape from the tension regulator, folding guide unit and the tape guide means except the tape guide drum, so that, in the event that the magnetic tape should have become adhered to the tape guide drum, it can be positively peeled off from the tape guide drum for tape unloading without causing any injury to the tape, thus assuring protection of the tape and preventing malfunction of the apparatus resulting from failure in tape winding.

Moreover, in the magnetic recording and reproducing apparatus of the present invention, the loading lever is driven by the planetary gearing driving in turn the loading ring in partial revolution, said loading lever driving the folding guide unit and the tension regulator adapted in turn for pulling out and guiding the magnetic tape from the tape cassette mounting section towards the tape guide drum which is equipped with the rotary magnetic heads. In this manner, tape loading and unloading may be effected by a single driving means, thus making it possible to reduce the overall size of the apparatus. In addition, in the magnetic recording and reproducing apparatus of the present invention, since the folding guide unit is used as means for pulling out and guiding the magnetic tape from the tape cassette mounting section towards the tape guide drum, the magnetic tape can be pulled out to distant points by means of the small-sized device, thus making it possible to reduce further the overall size of the apparatus.

In addition, in the magnetic recording and reproducing apparatus of the present invention, the loading ring is mounted at an angle relative to the plane of the chassis plate which is the mounting plane of the ring gear and connected to the ring gear by a pair of bevel gears one of which has a shaft perpendicular to the plane of the loading ring and the other of which has a shaft perpendicular to the plane of the chassis plate, while the lines connecting these shafts are parallel to the line of maximum inclination of the loading ring plane. Thus a spur gear may be used as the loading ring gear so that the loading ring can be machined easily and accurately. The loading ring can be accurately connected to the connection gearing adapted for transmitting the driving torque of the motor, while the mounting space may be reduced.

FIELD OF INDUSTRIAL UTILIZATION

As described hereinabove, the magnetic recording and reproducing apparatus of the present invention may be advantageously used in video tape recorders and especially in portable video tape recorders.

I claim:

1. A magnetic recording and reproducing apparatus comprising: a chassis, a loading electric motor mounted on the chassis, a planetary gearing unit mounted on said chassis for being driven in clockwise and counter-clockwise directions by said loading electric motor, a tape guide drum mounted on the chassis and provided with rotary magnetic heads, a loading ring having said tape guide drum arranged thereinside and being driven in rotation by said planetary gearing unit and adapted for winding a magnetic tape on the periphery of said tape guide drum, tape guide means arranged on said chassis proximate said loading ring for drawing out the tape from a cassette and guiding the tape from a tape mounting section towards and along a predetermined tape route in a direciton around said tape guide drum, said loading ring intercepting the tape guided by said tape guide means for winding the tape around the periphery of said tape guide drum, and a loading lever unit slideably mounted on said chassis, being operated for reciprocal motion by said planetary gearing unit, and being adapted for shifting said tape guide means, a tape tension regulator mounted on said chassis contacting the tape drawn out by said tape guide means and cooperating with said loading lever unit, and means cooperating with said loading lever unit driven by said planetary gearing unit for shifting said tape tension regulator between an unloading position and a loading position in response to the reciprocal motion of said loading lever, whereby the winding of the magnetic tape on said tape guide drum is released by rotationally driving said loading ring by said planetary gearing until driven by said loading electric motor and said loading lever unit is then operated for shifting said tape tension regulator and said tape guide means to their respective unloading positions out of engagement with said tape for returning the tape from the position extending along said tape route towards said tape mounting section.

2. A magnetic recording and reproducing apparatus according to claim 1, in which said planetary gearing unit includes a ring gear rotatably mounted on said chassis and being adapted for rotating said loading ring, said loading ring being mounted at an angle with respect to a plane perpendicular to a rotational axis of said ring gear, said loading ring being connected to said ring gear by a pair of mutually meshing bevel gears, one of which has a shaft perpendicular to the plane of the loading ring and the other of which has a shaft perpendicular to the plane in which said ring gear is mounted, with a line interconnecting said shafts being parallel to the line of maximum inclination of the loading ring plane.

3. The magnetic recording and reproducing apparatus as claimed in claim 1, in which said loading lever unit includes gear means for shifting said tape guide means between an unloading position and a loading position by the reciprocal motion of said loading lever unit, said tape guide means being adapted for drawing out and guiding the magnetic tape from a tape mounting section to said tape guide drum equipped with rotary magnetic heads in response to said means for shifting said tension regulator from an unloading to a loading position by the reciprocal motion of said loading lever unit.

4. The magnetic recording and reproducing apparatus as claimed in claims 1 wherein said planetary gearing unit includes a planetary gear and a ring gear and further comprising a cassette lock release lever adapted for releasing a lock of a cassette holder holding a tape cassette to be mounted in a cassette mounting section, said cassette lock release lever having a forward end in a circular orbit of said planetary gear, so that said cassette lock release lever is actuated by revolution of said planetary gear along said orbit.

5. The magnetic recording and reproducing apparatus claimed in claim 4 further comprising means for controlling the operation of said loading electric motor in dependence upon the position of said planetary gear on said circular orbit.

6. The magnetic recording and reproducing apparatus as claimed in claim 1, further comprising a mode selection lever slidably mounted on said chassis to be shifted to a plurality of positions corresponding to selected operating modes of said apparatus and including camming elements cooperating with said means for shifting said tape tension regulator for placing a tension on said tape in accordance with respective operating modes of said apparatus.

* * * * *